United States Patent
Lakshmikantha et al.

(10) Patent No.: US 9,667,518 B2
(45) Date of Patent: May 30, 2017

(54) METHOD AND SYSTEM FOR DELAY MEASUREMENT OF A TRAFFIC FLOW IN A SOFTWARE-DEFINED NETWORKING (SDN) SYSTEM

(71) Applicant: Telefonaktiebolaget L M Ericsson (publ), Stockholm (SE)

(72) Inventors: Ashvin Lakshmikantha, Bangalore (IN); Vinayak Joshi, Bangalore (IN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 77 days.

(21) Appl. No.: 14/852,293

(22) Filed: Sep. 11, 2015

(65) Prior Publication Data

US 2017/0078176 A1  Mar. 16, 2017

(51) Int. Cl.
H04L 12/26  (2006.01)
H04L 12/875  (2013.01)
H04L 12/715  (2013.01)

(52) U.S. Cl.
CPC .......... H04L 43/0852 (2013.01); H04L 45/64 (2013.01); H04L 47/562 (2013.01)

(58) Field of Classification Search
None
See application file for complete search history.

(56) References Cited

U.S. PATENT DOCUMENTS

| | | |
|---|---|---|
| 2014/0016474 A1 | 1/2014 | Beheshti-Zavareh et al. |
| 2015/0071108 A1* | 3/2015 | Lumezanu ............ H04L 43/106 370/253 |
| 2015/0163114 A1 | 6/2015 | Hsiao et al. |
| 2015/0244617 A1* | 8/2015 | Nakil .................. G06F 9/45558 709/224 |
| 2016/0149788 A1* | 5/2016 | Zhang .................... H04L 43/10 709/224 |

(Continued)

FOREIGN PATENT DOCUMENTS

EP  2 416 527 A1  2/2012

OTHER PUBLICATIONS

Altukhov et al., "On real-time delay monitoring in software-defined networks", 2014 First International Science and Technology Conference, IEEE, Oct. 28, 2014, pp. 1-6.

(Continued)

*Primary Examiner* — Anh-Vu Ly
(74) *Attorney, Agent, or Firm* — Nicholson De Vos Webster & Elliott LLP

(57) ABSTRACT

Methods for delay measurement in a software-defined networking (SDN) system are disclosed. In one embodiment, one packet each is received from a first and a second network device. The time stamps of these packets are recorded in a set of ingress time stamps and a set of egress time stamps respectively if the first and second network devices are the ingress and egress network devices of a traffic flow and if both packets include indications for delay measurement. Then the method continues with a delay measure for the traffic flow based on at least the sets of the ingress time stamps and egress time stamps associated with the flow identifier of the traffic flow, and a measurement noise the electronic device obtained from sending measurement packets to the first and second network devices.

20 Claims, 11 Drawing Sheets

(56) References Cited

U.S. PATENT DOCUMENTS

| | | | |
|---|---|---|---|
| 2016/0226742 A1* | 8/2016 | Apathotharanan | H04L 43/12 370/252 |
| 2016/0248656 A1* | 8/2016 | Anand | H04L 47/22 370/252 |
| 2016/0352866 A1* | 12/2016 | Gupta | H04L 67/42 370/252 |

OTHER PUBLICATIONS

Nick McKeown, Software-defined Networking, Infocom, Apr. 2009, 64 pages.
D. Katz et al., "Bidirectional Forwarding Detection (BFD)", Internet Engineering Task Force (IETF), Request for Comments: 5880, Jun. 2010, pp. 1-49.
D. Katz et al., "Bidirectional Forwarding Detection (BFD) for IPv4 and IPv6 (Single Hop)", Internet Engineering Task Force (IETF), Request for Comments: 5881, Jun. 2010, pp. 1-7.
D. Katz et al., "Generic Application of Bidirectional Forwarding Detection (BFD)", Internet Engineering Task Force (IETF), Request for Comments: 5882, Jun. 2010, pp. 1-17.
D. Katz et al., "Bidirectional Forwarding Detection (BFD) for Multihop Paths", Internet Engineering Task Force (IETF), Request for Comments: 5883, Jun. 2010, pp. 1-6.
"Ethernet ring protection switching", ITU-T, G.8032/Y.1344, Feb. 2012, 104 pages.
Prashant A. Anand et al., "High-Precision Packet Train Generation", U.S. Appl. No. 14/628,121, filed Feb. 20, 2015, pp. 1-50.
Nurit Sprecher, "Tunnel OAM Requirements and Considerations", Nokia Siemens Networks, Oct. 2010, 36 pages.
"OpenFlow Switch Specification Version 1.3.5 (Protocol version 0x04)", Open Network Foundation, Mar. 26, 2015, pp. 1-177.
J. Postel, "User Datagram Protocol," Aug. 28, 1980, 3 pages, RFC: 768.
"Transmission Control Protocol, DARPA Internet Program Protocol Specification," Sep. 1981, 91 pages, RFC: 793, Information Sciences Institute, University of Southern California, Marina del Rey, California.
T. Socolofsky, et al., "A TCP/IP Tutorial," Jan. 1991, 28 pages, Network Working Group, Request for Comments: 1180.
S. Deering, et al., "Internet Protocol, Version 6 (IPv6) Specification," Dec. 1998, 39 pages, Network Working Group, Request for Comments: 2460, The Internet Society.
K. Nichols, et al., "Definition of the Differentiated Services Field (DS Field) in the IPv4 and IPv6 Headers," Dec. 1998, 20 pages, Network Working Group, Request for Comments: 2474, The Internet Society.
S. Blake, et al., "An Architecture for Differentiated Services," Dec. 1998, 36 pages, Network Working Group, Request for Comments: 2475, The Internet Society.
J. Heinanen, et al., "Assured Forwarding PHB Group," Jun. 1999, 11 pages, Network Working Group, Request for Comments: 2597, The Internet Society.
D. Borman, et al., "IPv6 Jumbograms," Aug. 1999, 9 pages, Network Working Group, Request for Comments: 2675, The Internet Society.
D. Black, "Differentiated Services and Tunnels," Oct. 2000, 14 pages, Network Working Group, Request for Comments: 2983, The Internet Society.
K. Nichols, et al., "Definition of Differentiated Services Per Domain Behaviors and Rules for their Specification," Apr. 2001, 24 pages, Network Working Group, Request for Comments: 3086, The Internet Society.
D. Black, et al., "Per Hop Behavior Identification Codes," Jun. 2001, 8 pages, Network Working Group, Request for Comments: 3140, The Internet Society.
B. Davie, et al., "An Expedited Forwarding PHB (Per-Hop Behavior)," Mar. 2002, 16 pages, Network Working Group, Request for Comments: 3246, The Internet Society.
A. Charny, et al., "Supplemental Information for the New Definition of the EF PHB (Expedited Forwarding Per-Hop Behavior)," Mar. 2002, 24 pages, Network Working Group, Request for Comments: 3247, The Internet Society.
D. Grossman, "New Terminology and Clarifications for Diffserv," Apr. 2002, 10 pages, Network Working Group, Request for Comments: 3260, The Internet Society.
F. Baker, et al., "Management Information Base for the Differentiated Services Architecture," May 2002, 116 pages, Network Working Group, Request for Comments: 3289, The Internet Society.
Y. Bernet, et al., "An Informal Management Model for Diffsery Routers," May 2002, 56 pages, Network Working Group, Request for Comments: 3290, The Internet Society.
K. Chan, et al. "Differentiated Services Quality of Service Policy Information Base," Mar. 2003, 96 pages, Network Working Group, Request for Comments: 3317, The Internet Society.
B. Fenner, et al., "Management Information Base for the User Datagram Protocol (UDP)," Jun. 2005, 19 pages, Network Working Group, Request for Comments: 4113, The Internet Society.
S. Kent, et al., "Security Architecture for the Internet Protocol," Dec. 2005, 101 pages, Network Working Group, Request for Comments: 4301, The Internet Society.
R. Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.
E. Rosen, et al., "BGP/MPLS IP Virtual Private Networks (VPNs)," Feb. 2006, 47 pages, Network Working Group, Request for Comments: 4364, The Internet Society.
J. Babiarz, et al., "Configuration Guidelines for DiffServ Service Classes," Aug. 2006, 57 pages, Network Working Group, Request for Comments: 4594, The Internet Society.
K. Kompella, et al., "Virtual Private LAN Service (VPLS) Using BGP for Auto-Discovery and Signaling," Jan. 2007, 28 pages, Network Working Group, Request for Comments: 4761, The IETF Trust.
M. Lasserre, et al., "Virtual Private LAN Service (VPLS) Using Label Distribution Protocol (LDP) Signaling," Jan. 2007, 31 pages, Network Working Group, Request for Comments: 4762, The IETF Trust.
L. Eggert, et al., "Unicast UDP Usage Guidelines for Application Designers," Nov. 2008, 27 pages, Network Working Group, Request for Comments: 5405, IETF Trust and the persons identified as the document authors.
F. Baker, et al., "A Differentiated Services Code Point (DSCP) for Capacity-Admitted Traffic," May 2010, 14 pages, Internet Engineering Task Force (IETF), Request for Comments: 5865, IETF Trust and the persons identified as the document authors.

* cited by examiner

Table 1 502

| Match Field | Action |
|---|---|
| Flow ID | Meter Action: DSCP Remark GoTo Table 2 |

Table 2 504

| Match Field | Priority | Timer | Value Action |
|---|---|---|---|
| Flow ID, DSCP Value = remarked value | 10 | 30 Sec. | SC ID = 11, Goto Table 3 |
| Flow ID, DSCP Value = Original value | 10 | 30 Sec. | SC ID = 10, Goto Table 3 |
| Flow ID | 1 | - | SC ID = 10, Goto Table 3 |

Table 3 506

| Match Field | Priority | Timer | Value Action |
|---|---|---|---|
| SC ID = 10 | 1 | - | GRPID = 4, Goto Table 4 |
| SC ID = 11 | 10 | 30 Sec. | GRPID = 5, Goto Table 4 |

Table 4 508

| Match Field | Priority | Timer | Value Action |
|---|---|---|---|
| GRPID = 4 | 1 | - | Send to processing port |
| GRPID = 5 | 10 | 30 Sec. | Send to processing port, Send to delay monitor port |

FIG. 5

Table 1 602

| Match Field | Priority | Timer | Value Action |
|---|---|---|---|
| Flow ID, DSCP Value = remarked value | 10 | 30 Sec. | SC ID = 12, Goto Table 2 |
| Flow ID, DSCP Value = Original value | 10 | 30 Sec. | SC ID = 11, Goto Table 2 |
| Flow ID | 1 | - | SC ID = 10, Goto Table 2 |

Table 2 604

| Match Field | Priority | Timer | Value Action |
|---|---|---|---|
| SC ID = 10 | 1 | - | GRPID = 4, Goto Table 3 |
| SC ID = 11 | 10 | 30 Sec. | GRPID = 5, Goto Table 3 |
| SC ID = 12 | 10 | 30 Sec. | GRPID = 6, Goto Table 3 |

Table 3 606

| Match Field | Priority | Timer | Value Action |
|---|---|---|---|
| GRPID = 4 | 1 | - | Send to exit port |
| GRPID = 5 | 10 | 30 Sec. | Send to exit port |
| GRPID = 6 | 10 | 30 Sec. | Send to exit port, Send to delay monitor port, Set DSCP = Original Value |

FIG. 6

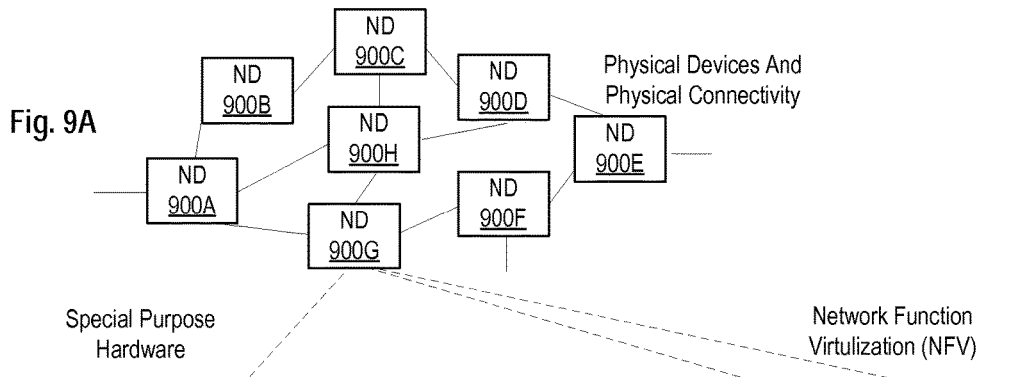
Fig. 9A
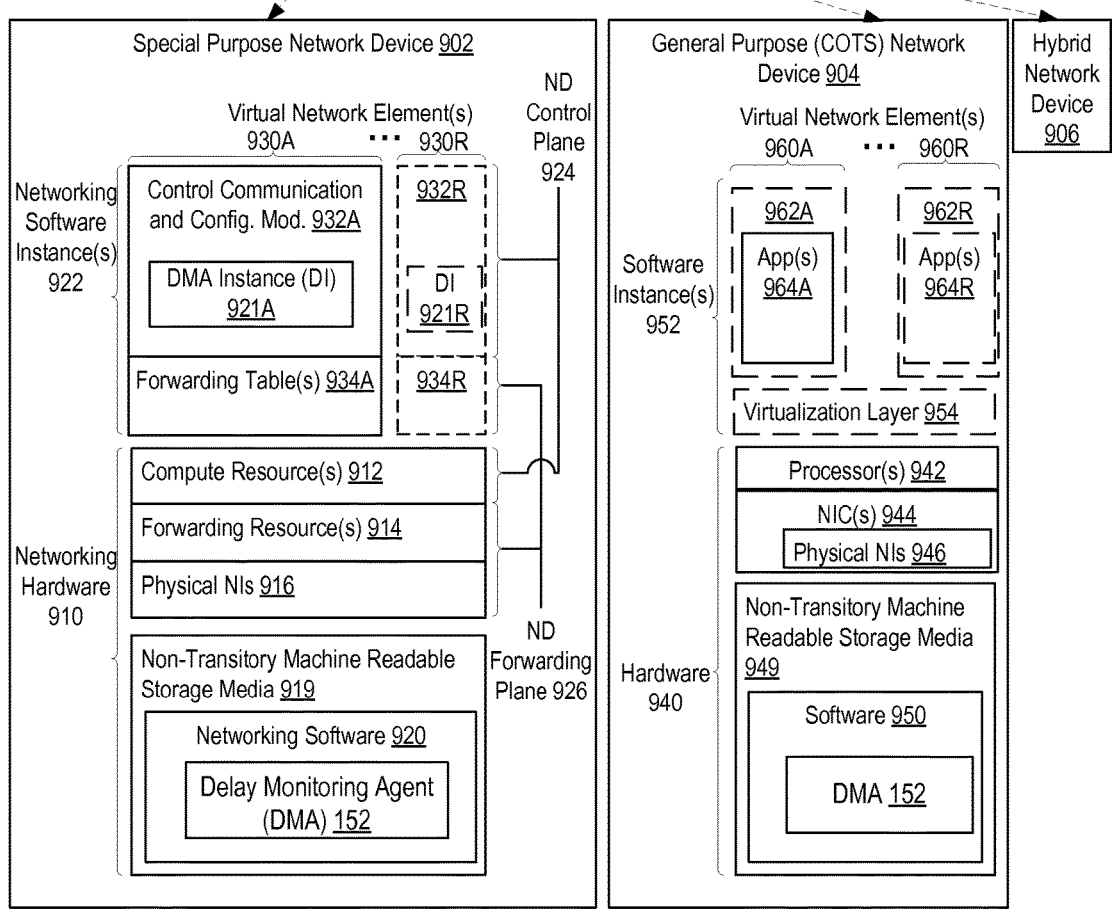
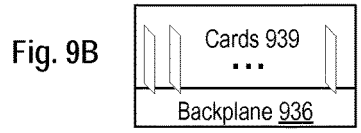
Fig. 9B

METHOD AND SYSTEM FOR DELAY MEASUREMENT OF A TRAFFIC FLOW IN A SOFTWARE-DEFINED NETWORKING (SDN) SYSTEM

FIELD OF INVENTION

The embodiments of the invention are related to the field of networking. More specifically, the embodiments of the invention relate to a method and system for delay measurement of a flow in a software-defined networking (SDN) system.

BACKGROUND

Software-defined networking (SDN) is a network architecture that aims at decoupling control plane functions from data plane functions such that separate apparatuses may be utilized for different functions. In the SDN architecture, network intelligence and states are logically centralized, and the underlying network infrastructure is abstracted from the applications. As a result, networking may be simplified and new applications become feasible. For example, network virtualization can be accomplished by implementing it in a software application where the control plane is separated from the data plane. Also, a network administrator of a SDN system may have programmable central control of network traffic without requiring physical access to the system's hardware devices. With these benefits, SDN architecture based systems (referred to as SDN systems or SDN networks exchangeably herein below) are gaining popularity among carriers and enterprises.

A SDN system includes one or more SDN controllers and a set of network elements managed by the SDN controllers. In a SDN system, network delay of the SDN system for a traffic flow is the time taken by the traffic flow as it traverses one or more of the set of network elements. Network delay can be measured for an individual traffic flow, an aggregate of traffic flows, or an application serving traffic flows in the SDN system. Network delay, including delay variance (often referred to as jitter), is an important metric of network performance, and it is often tied to a service level agreement (SLA) with a client of the SDN system. Thus, it is important to develop methods to measure network delay accurately in a SDN system.

SUMMARY

Methods for delay measurement in a software-defined networking (SDN) system are disclosed. In one embodiment, the method is implemented in an electronic device coupled to a software-defined networking (SDN) system, where the SDN system includes a SDN controller managing a plurality of network devices. The method includes upon receiving a first packet of the plurality of network devices, recording a first time stamp in a set of ingress time stamps if the first packet includes one indication for delay measurement and if the first network device is an ingress network device of a traffic flow, where the first time stamp is to be associated with a flow identifier included in the first packet. The method continues with upon receiving a second packet of the plurality of network devices, recording a second time stamp in a set of egress time stamps if the second packet includes one indication for delay measurement and if the second network device is an egress network device of the traffic flow, where the set of egress time stamps is to be associated with the flow identifier, and the set of ingress time stamps. The method further includes calculating a delay measure for the traffic flow based on at least the sets of the ingress time stamps and egress time stamps associated with the flow identifier, and a measurement noise the electronic device obtained from sending measurement packets to the first and second network devices.

Electronic devices for delay measurement in a software-defined networking (SDN) system are disclosed. In one embodiment, an electronic device is coupled to a software-defined networking (SDN) system, where the SDN system includes a SDN controller managing a plurality of network devices. The electronic device comprises a processor and a non-transitory machine-readable storage medium coupled to the processor, and the non-transitory machine-readable storage medium containing operations executable by the processor. The electronic device is operative to: upon receiving a first packet of the plurality of network devices, record a first time stamp in a set of ingress time stamps if the first packet includes one indication for delay measurement and if the first network device is an ingress network device of a traffic flow, wherein the first time stamp is to be associated with a flow identifier included in the first packet; upon receiving a second packet of the plurality of network devices, record a second time stamp in a set of egress time stamps if the second packet includes one indication for delay measurement and if the second network device is an egress network device of the traffic flow, wherein the set of egress time stamps is to be associated with the flow identifier, and the set of ingress time stamps; and calculate a delay measure for the traffic flow based on at least the sets of the ingress time stamps and egress time stamps associated with the flow identifier, and a measurement noise the electronic device obtained from sending measurement packets to the first and second network devices.

Non-transitory machine-readable storage media for delay measurement in a software-defined networking (SDN) system are disclosed. In one embodiment, a non-transitory machine-readable storage medium has instructions stored therein, which when executed by a processor, cause the processor to perform operations in an electronic device coupled to a software-defined networking (SDN) system, where the SDN system includes a SDN controller managing a plurality of network devices. The operations include upon receiving a first packet of the plurality of network devices, recording a first time stamp in a set of ingress time stamps if the first packet includes one indication for delay measurement and if the first network device is an ingress network device of a traffic flow, where the first time stamp is to be associated with a flow identifier included in the first packet. The operations continue with upon receiving a second packet of the plurality of network devices, recording a second time stamp in a set of egress time stamps if the second packet includes one indication for delay measurement and if the second network device is an egress network device of the traffic flow, where the set of egress time stamps is to be associated with the flow identifier, and the set of ingress time stamps. The operations further include calculating a delay measure for the traffic flow based on at least the sets of the ingress time stamps and egress time stamps associated with the flow identifier, and a measurement noise the electronic device obtained from sending measurement packets to the first and second network devices.

Embodiments of the disclosed techniques aim at implementing an efficient way to measure delay of a traffic flow in a SDN system.

BRIEF DESCRIPTION OF THE DRAWINGS

The invention may best be understood by referring to the following description and accompanying drawings that are used to illustrate embodiments of the invention. In the drawings:

FIG. 5 illustrates exemplary forwarding tables and forwarding table entries for the sampling of packets at an ingress network element according to one embodiment of the invention.

FIG. 6 illustrates exemplary forwarding tables and forwarding table entries for processing the sampled packets at an egress network element according to one embodiment of the invention.

FIG. 9A illustrates connectivity between network devices (NDs) within an exemplary network, as well as three exemplary implementations of the NDs, according to some embodiments of the invention.

FIG. 9B illustrates an exemplary way to implement a special purpose network device according to some embodiments of the invention.

DETAILED DESCRIPTION

Figure 1A:
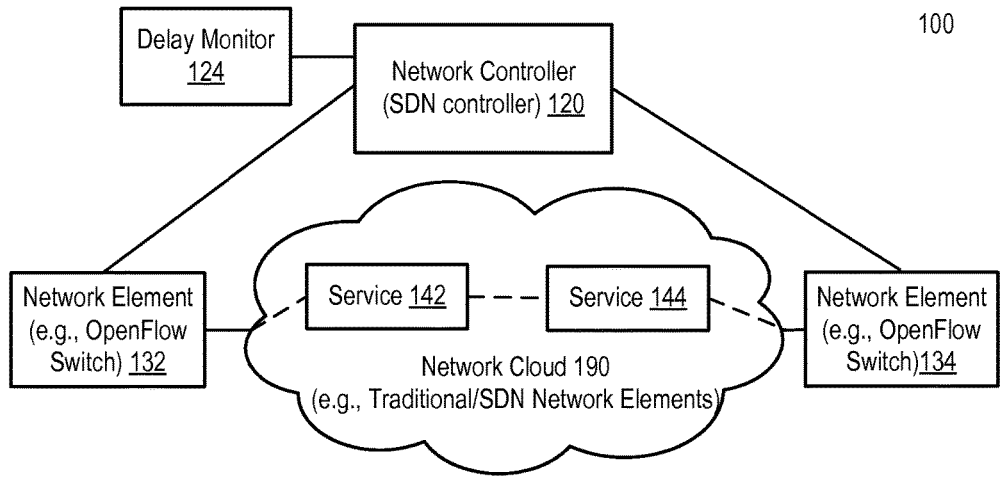
FIG. 1A illustrates service chaining in a SDN system.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random-access memory (DRAM), static random-access memory (SRAM)) of that electronic device. Typical electronic devices also include a set or one or more physical network interface(s) to establish network connections (to transmit and/or receive code and/or data using propagating signals) with other electronic devices.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). A network device may implement one or more network element, and one network element may span multiple network devices as discussed in more details herein below.

Network Delay Measure Approaches

In a software-defined networking (SDN) system, packets are forwarded through traffic flows (or simply referred to as flows), and a network element forwards the flows based on its forwarding tables, which are managed by one or more network controllers (also referred to as SDN controller, where the terms are used interchangeably in the specification). A flow may be defined as a set of packets whose headers match a given pattern of bits. A flow may be identified by a set of attributes embedded to one or more packets of the flow. An exemplary set of attributes includes a 5-tuple (source and destination IP addresses, a protocol type, source and destination TCP/UDP ports).

Service chaining in a SDN system is a way to stitch multiple customer specific services, and to lead the traffic flow through the right path (a service chain) in the SDN system. FIG. 1A illustrates service chaining in a SDN system. SDN system 100 includes a network controller (also referred to as a SDN controller, the two terms are used interchangeably in this specification) 120 managing a plurality of network elements, including network elements 132 and 134. These network elements may be implemented as OpenFlow switches when they comply with OpenFlow standards such as "OpenFlow Switch Specification," latest version 1.3.5 dated March 2015.

Network elements 132 and 134 are communicated through a network cloud 190, which may contain traditional network elements such as routers/switches or other SDN network elements. Network elements 132 and 134 are connected to service functions such as services 142 and 144 in the network cloud 190. The service functions (also often referred to service applications) provide services such as deep packet inspection (DPI), logging/metering/charging/advanced charging, firewall (FW), virus scanning (VS), intrusion detection and prevention (IDP), network address translation (NAT), etc., to manage subscribers' traffic. These services may be hosted in dedicated physical hardware, or in virtual machines associated with network elements (e.g., residing in or coupled to the network elements) in the network cloud 190. Also, network elements 132 and 134 may also host one or more of these or other service functions.

In service chaining, incoming packets are classified based on the packet header fields (e.g., a flow identifier) by a network element, and the packets may be sent to one or more service functions associated with the network element. After the one or more service functions process the packets, the network element forward the packets to the next element for subsequent service functions until the packets are processed by a predetermined service chain. This process may necessitate packet classification at every network element on the path of the predetermined service chain, thus the process can be inefficient and complex to implement.

A network service header (NSH) based service chain forwarding improves the process by introducing a new header into the packets so the repeated packet classification is unnecessary. In the NSH based service chain forwarding, a classification function (which may reside inside a network element associated with a service function) classifies the packets and inserts a NSH header into the packets. All along the path of the predetermined service chain, the packet forwarding may be based on contents of this header thus eliminates the need of re-classification.

Although the NSH based service chain forwarding is efficient in comparison, it mandates the support for NSH on the network elements and the service functions. For example, a service function may require a proxy function that is position between a network element and the service function, where the proxy function performs NSH addition/removal to support the service function unaware of the NSH. NSH header stamping and processing are not standardized in the OpenFlow standards presently, thus, transition to NSH based service chain forwarding in a commercial deployment, if happens, will be a gradual process, and the NSH based and non-NSH based service chain forwarding will co-exist, at least for the time being. Thus, a process on a service chain has to cater to both NSH and non-NSH based service chain forwarding.

As discussed herein above, network delay may be defined as the time taken by a traffic flow as it traverses a set of network elements in a network such as a SDN system. One may estimate the network delay by measuring the first time when a packet arrives at the network and the second time when the packet exits the network. The difference between the first and second time is an estimate of the network delay for that packet. In order to minimize measurement errors, a number of such measurements may be averaged out to arrive at a network delay estimate.

The network delay of a service chain is the total delay experienced by a packet through the service chain. In the example of FIG. 1A, where the service chain includes services 142 and 144, it is the time spent by a packet between two points: 1). Service plane entry point: point at which the packet arrives at a first network element associated with the service 142; and 2) service plane exit point: point at which the packet eventually exits a second network element associated with the service 144 (i.e., the network element completes processing of the packet).

The network delay measurement is traditionally an important factor in SLA verification and network troubleshooting. When the network delay measurement is for a service chain in a SDN system, the measured network delay on a live network can additionally be used for the following: 1). The measured network delay can be fed into the network controller and can be used for service chain path load balancing by rearrange the path of the service chain so the path may be updated to minimize the network delay; 2) The measurement network delay may be used for determining the virtual machine load and behavior analyses and the analyses can help the SDN system redeploy service functions (spawning new VMs for adding service functions, shutting down existing VMs for removing and migrating service functions). Thus, it is even more important to get accurate network delay measurement as network infrastructure transitioning from traditional networks to SDN networks.

Two way active measurement protocol (TWAMP) is the most commonly used path delay measurement protocol in traditional routers and switches. TWAMP can be used for both one-way and two-way delay determination. In TWAMP, a test stream of UDP based request-response messages are generated and time stamped at the two ends of the path whose delay is to be measured. TWAMP expects that the two ends are time-synchronized using network time protocol (NTP) or precision time protocol (PTP). The time stamp differences convey the path delay. It is to be noted that TWAMP does not measure the delay experienced by the real traffic on the path, and TWAMP measures the delay experienced by a test stream. The assumption is that this measurement is close to the delay experienced by the real traffic. This might be a fairly valid assumption in case of traditional network paths that typically consist of packet forwarding nodes that are unaware of service functions the packets are to be processed. Thus, for a traditional network, TWAMP may be an acceptable solution.

However, for a service chain, the network delay is a sum of not only switching, processing, and transport delays that may incur for both the real traffic and the test stream, the network delay also includes time spent in service functions. While the switching, processing, and transport delays are in the order of few tens of microseconds, service function processing time could be in the order of several milliseconds or higher. Thus, in order to get the true estimate of the network delay facing by a traffic flow (a type of real traffic), the test stream must not only pass through the network path, but also get processed with similar complexity in service functions. Not only this is significantly difficult to achieve, it also creates other problems. The service functions are often stateful and keep the state of packet processed by the service functions. If packets of the test stream are made to traverse the same service functions and to be processed similarly, the packets would pollute the states maintained by the service functions and may cause other networking issues. Furthermore, one way delay measurement requires time synchronization between network elements at the two ends of the paths, and this would require NTP/PTP implementation on all the network elements. Such requirement often not acceptable in many types of networks such as data center systems.

More recently, with the assumption that all the network elements and service functions understand NSH, a method to measure service chain delay of real traffic is proposed. A packet is time stamped at the service plane entry point, and the time stamp information is carried in the NSH (e.g., in the service platform context field of the NSH). Similarly at the service plane exit point, the packet is time stamped at the time of exit. The service plane exit point transmits the time at the service plane entry point (the time obtained through the NSH) and the time at the service plane exit point to a network controller (e.g., a network controller 120 in FIG. 1A), which then calculates the difference to identify the network delay (e.g., using a delay monitor 124 within or coupled to the network controller 120). Since the spare field in the NSH is used for carrying time stamps, the original packet is not modified. The method requires the service plane entry point and exit point are time synchronized and the time-stamping capability is available at both the service plane entry point and exit point. Thus, when the network delay measurement is required for multiple traffic flows entering and existing all the network elements, all the network elements need to support NTP/PTP and NSH, and such requirements may not be acceptable in many types of networks. Additionally, the disclosed method does not specify a northbound method to program the network elements for time-stamping, how time stamps are collected, or how to scale to measure network delay with minimum impact on the network controller.

Thus, these TVs/AMP and NSH based solution are insufficient in SDN systems that are currently in deployment or will be deployed in the future, and a better solution would not require (1) additional test streams, (2) the service plane entry point and exit point to be time synchronized, and/or (3) all the network elements to support NTP/PTP and NSH.

Centralized Network Delay Measurement in a SDN System

A centralized network delay measurement approach is proposed according to one embodiment. The approach is illustrated in FIG. 1A. Network elements 132 and 134 are the ingress and egress network elements of a traffic flow respectively, i.e., the traffic flow enters the network 100 through the network element 132 and exits the network 100 through the network element 134. The delay monitor 124 may be an electronic device (e.g., a physical server) coupled to the network controller 120 or a software module (e.g., a software application such as a virtual machine) within or coupled to the network controller 120 that runs to make delay measurements. The delay monitor 124 is responsible for receiving packets, time-stamping the packets, and making the time stamp information and packet information available for the network controller 120 for further processing.

For example, a traffic flow enters the network 100 through the network element 132 and exits the network 100 through the network element 134. While packets of the traffic flow are transmitted from the network element 132 to the network element 134, the packets are duplicated and transmitted from the network element 132 to the delay monitor 124 (e.g., through the standard OpenFlow messages). At the network element 134, the received packets are duplicated and transmitted from the network element 134 to the delay monitor 124. The delay monitor 124 time stamps both groups of packets, at time designated as T1 and T2 respectively. The difference between T2 and T1, T2-T1 should be the network delay for the service chain of the traffic flow in system 100. It is to be noted that since the time-stamping is performed at the delay monitor 124, the network elements 132 and 134 (the service plane entry point and exit point for the traffic flow respectively) do not need time synchronization.

The network delay of the service chain is not limited to a single traffic flow. Packets belong to multiple flows may traverse the same service chain. For example, if all hypertext transfer protocol (HTTP) packets have to traverse a service chain, the HTTP packets belonging to millions of subscribers (hence millions of traffic flows) may traverse the same service chain. Thus, there is no single service chain delay number in this case. Instead, the average delays on different flows need to be measured and one way to determine the average service chain delay is to calculate the average of delays experienced by multiple flows traversing the same service chain. Similarly, jitter, and the maximum and minimum delays may be calculated.

Figure 1B:
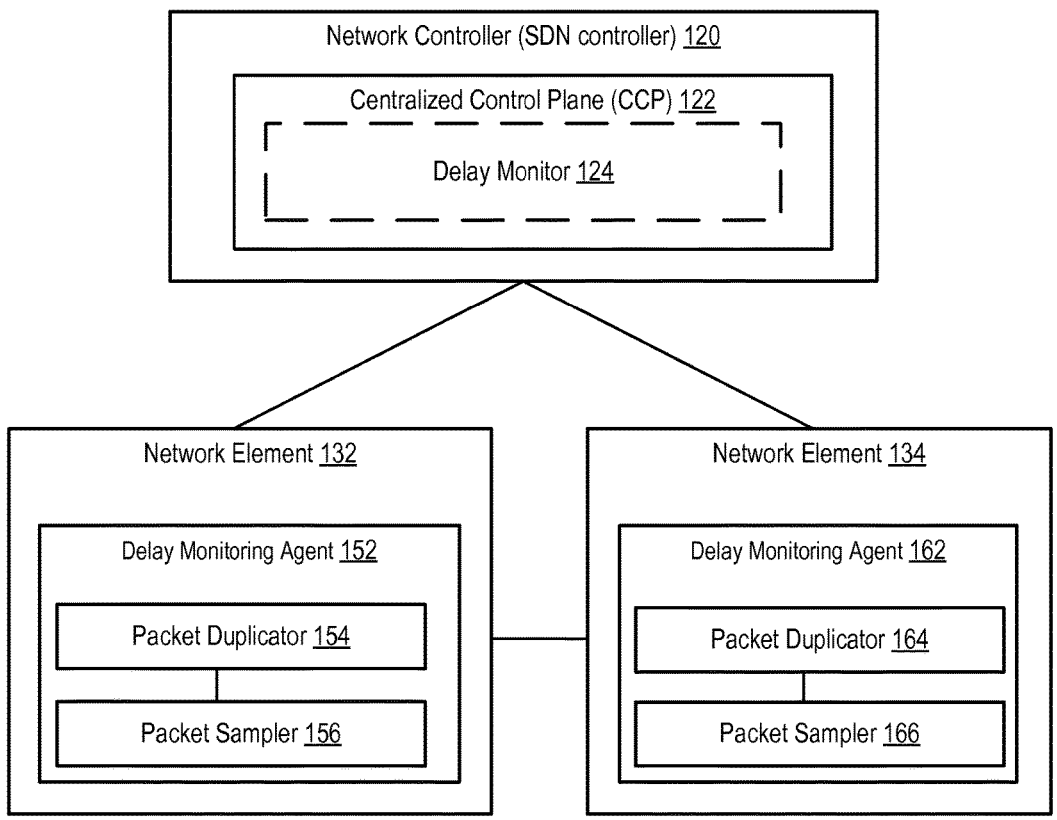
FIG. 1B illustrates modules in a SDN system for the centralized network delay measure according to one embodiment of the invention.

FIG. 1B illustrates modules in a SDN system for the centralized network delay measure according to one embodiment of the invention. FIG. 1B is similar to FIG. 1A and the same or similar references indicate elements or components having the same or similar functionalities. Certain aspects of FIG. 1A have been omitted from FIG. 1B in order to avoid obscuring other aspects of FIG. 1B. Additionally, the delay monitor 124 resides within the network controller 120 in FIG. 1B, illustrating an alternative embodiment. The delay monitor 124 is a module within the centralized control plane 122, and the functionalities of the centralized control plane is detailed in relation to FIGS. 9-10.

Network elements 132 and 134 (each may be implemented in a network device) include delay monitoring agents 152 and 162 respectively. The delay monitoring agent 152 includes a packet sampler 156 and a packet duplicator 154, and the delay monitoring agent 162 includes a packet sampler 166 and a packet duplicator 164. The packet duplicators are to duplicate packets so that the duplicated packets may be sent to the delay monitor 124 as discussed herein above; and the packet samplers are for sampling the packets of traffic flows to address the scalability issues, as discussed in more details herein below.

The centralized network delay measurement approach faces several challenges to provide accurate delay measurements. One challenge is the measurement noise. The time-stamping is not done at the ingress/egress network elements of a traffic flow, but it is done at the centrally located delay monitor 124. The packets take non-zero and seemly random amount of time to reach the delay monitor 124, this centralized approach introduce measurement noise in the delay measurement. The measurement noise can be of the same order as the delay measurement itself. Thus, the centralized approach should ideally cancel out the noise component from the measurement. The measurement noise includes two main components: (1) The communication delay between the ingress/egress network elements 132/134 and the delay monitor 124; and (2) the packet processing delay at the delay monitor 124. There can be random delay between (a) the time at which the packets arrive at the network interface card (NIC) of the electronic device including the delay monitor 124 and (b) the time time-stamping is performed at the delay monitor 124. For example, if time-stamping is performed in the Linux user space inside the delay monitor 124, the packet delay between the NIC and the application vary in the order of milliseconds.

Another challenge is packet drop. A packet may be dropped between the network elements 132 and 134, and the delay measurement of the duplicated packets of the dropped packet has no meaning. The duplicated packets (from either the network elements 132 or 134 to the delay monitor 124) of the packet may also be dropped prior to arriving at the delay monitoring 124, thus there is no valid measurement for the packet. Thus, it is necessary to utilize a statistic modeling so enough packets are measured to mitigate the packet drop.

Another challenge is how to scale the delay measurement. If one has to measure delay over a long period of time (e.g., over one month according to an agreed upon SLA with a user of the network 100), a naive implementation would require a large number of copies of packets are duplicated at the network elements 132 and 134. The large number of copies are then transported to the network controller 120 and arrived at the delay monitor 124, and the additional traffic burdens the network 100. Additionally, the delay monitor 124 needs to time-stamp the large number of copies, and it may need to (1) initiate multiple instances of the delay monitor and (2) ensure the multiple instances are synchronized (through NTP/PTP or otherwise). Thus, one embodiment of the invention utilizes sampling through the packet samplers 156 and 166. The sampling needs to be done on the same packets at the ingress/egress network elements.

Mathematics for the Centralized Network Delay Measurement

Embodiments of this invention aim at addressing these challenges. In order to understand the problem better, the mathematic foundation of the centralized network delay measurement is discussed herein below.

The Strong Law of Large numbers states that if the variance of a random variable distribution is finite, then the average of a large number of the variable instances will converge almost surely to its mean. The central limit theorem provides bounds on how fast does the average converge to the mean. More specifically, central limit theorem tells us that if $\{X_i\}$ are instances of random variable X with mean $\mu$ and variance $\sigma^{-2}$, then:

$$\lim_{N\to\infty} P\left\{\frac{\sum_{i=0}^{N} X_i - N\mu}{\sqrt{N}}\right\} \sim N(0, \sigma^2) \quad \text{Equation 1}$$

Where N (0, $\sigma^2$) represents a Normal distribution with zero mean and variance $\sigma^{-2}$. The convergence is in distribution.

For a "large enough" N, we can approximate the probability of a deviation of the average from its mean by the following equation:

$$P\{Z_N > l\} = $$
$$P\{Z_n < -l\} \approx \frac{1}{\sqrt{2\pi\sigma^2}} \int_{l}^{\infty} e^{\frac{x^2}{2\sigma^2}} dx = \frac{1}{2} erfc\left(\frac{l}{\sqrt{2\sigma}}\right) \quad \text{Equation 2}$$

Where $$Z_N = \frac{\sum_{i=0}^{N} X_i - N\mu}{\sqrt{N}}$$

and $erfc$ denotes the complementary error function.

Let's consider a system, whose state variable is x, which is the quantity that needs to be measured. Now, whenever such a measurement is made, it introduces a noise w with zero mean and non-zero variance. The observed value is y. Then y=x+w. If we repeat the experiment multiple times, then we get a series of observed values $\{y_i\}$, from which we need to estimate x. More specifically, the question is how many samples should we collect to know whether we can accurately estimate x from $\{y_i\}$. One way is to consider the average of the N samples that we measured to be the estimate of x, so that:

$$E[y] = \lim_{N\to\infty} \frac{\sum_{i=0}^{N} y_i}{N} = \lim_{N\to\infty} \frac{Nx + \sum_{i=0}^{N} w_i}{N} = \lim_{N\to\infty}\left(x + \frac{\sum_{i=0}^{N} w_i}{N}\right) = x \quad \text{Equation 3}$$

This is because, by Strong law of large numbers, since $\{w_i\}$ are zero mean, the measurement noise goes to zero as we take more and more samples. The question is when to stop. The answer is given by Central Limit Theorem. The probability estimate for a deviation can be rewritten as the following:

$$P\{|S_N| > l\sqrt{N}\} \approx erfc\left(\frac{1}{\sqrt{2}\sqrt{N}\sigma}\right) \quad \text{Equation 4}$$

Where $$S_N = \frac{\sum_{i=0}^{N} y_i - Nx}{\sqrt{N}}$$

Let's suppose that we want to estimate delays with a minimum bound of 100 us (the reason to do this is so that we can limit the maximum error in measurement: if the error tolerated is +/−5 us and the total delay is 100 us (or higher), it would lead to a maximum of 5% error; on the other hand, if the total delay is 10 us (or higher), it would lead to a maximum error of 50%) with an error of ±5 us (i.e., the maximum exemplary error in measurement is 5%). Let's further suppose that the confidence in the delay measurements is represented by a variable, CI, which has a value between 0 and 1. For example, when CI=0.99, which means the noise component will be less than the desired value in 99% of the cases. Then, it would follow that:

$$P\{|S_N| > l\sqrt{N}\} \approx erfc\left(\frac{l\sqrt{N}}{\sqrt{2}\,\sigma}\right) > 1 - CI \quad \text{Equation 5}$$

Equivalently, one may deduce the following:

$$\left(\frac{l\sqrt{N}}{\sqrt{2}\,\sigma}\right) > erfc^{-1}(1 - CI) \quad \text{Equation 6}$$

It is to be noted that the inequality changes as one takes the inverse. This is because the erfc is a monotonically decreasing function. This translates to:

$$N > 2(erfc^{-1}(1-CI))^2 \frac{\sigma^2}{l^2} \quad \text{Equation 7}$$

Using the example of CI=0.99, one may get $l\sqrt{N}>1.83*\sqrt{2}\sigma$. After taking into account that the error in estimation is ±5 us (i.e., l=5 us), we would obtain $$N < 7\left(\frac{\sigma}{5us}\right)^2.$$

Thus, if the standard deviation of the w process is 100 us, then we would require a maximum of 2800 samples to produce the estimation of x with 99% confidence interval (CI=0.99).

With regard to FIGS. 1A-1B, the following time variables may be defined in Table 1:

TABLE 1

Time Variable Definition

| Variable Name | Definition |
|---|---|
| $T_{en}$ | Actual time of packet entry point at the ingress network element |
| $T_{ex}$ | Actual time of packet exit point at the egress network element |
| $T_{nd}$ | The network delay on service plane delay faced by the actual flow packet |
| $T_{p1}$ | The propagation delay faced by the copy of the packet sent from the ingress network element |
| $T_{p2}$ | The propagation delay faced by the copy of the packet sent from the egress network element |
| $T_{kp1}$ | The software kernel processing delay at the delay monitor faced by the packet sent from the ingress network element |
| $T_{kp1}$ | The software kernel processing delay at the delay monitor faced by the packet sent from the egress network element |

TABLE 1-continued

Time Variable Definition

| Variable Name | Definition |
|---|---|
| $T_1$ | The time stamp of the packet sent from the ingress network element |
| $T_2$ | The time stamp of the packet sent from the egress network element |
| $T_{mn1}$ | Measurement noise associated with time stamp for the ingress network element |
| $T_{mn2}$ | Measurement Noise associated with time stamp at the egress network element |

Based on the definitions, one may deduce the following:

$$T_1 = T_{en} + T_{p1} + T_{kp1} = T_{en} + T_{mn1}$$

$$T_2 = T_{ex} + T_{p2} \pm T_{kp2} = T_{ex} + T_{mn2}$$

$$T_{ex} = T_{en} + T_{nd}$$

Thus, $T_2-T_1=T_{nd}+T_{kp2}-T_{kp1}+T_{p2}-T_{p1}=T_{nd}+T_{mn2}-T_{mn1}$

One needs to cancel out the $T_{mn2}-T_{mn1}$ to get the correct estimate of Network Delay. Both $T_{mn2}$ and $T_{mn1}$ consist of the following components: (1) prorogation delay; and (2) software kernel processing delay at the delay monitor. By knowing the variance of $T_{mn2}$ and $T_{mn1}$ and based on derivations in equations 1-7, the total number of samples required to produce reliable estimate of the $T_2$ and $T_1$ is $$N > 14\left(\frac{\sigma}{5us}\right)^2,$$

where 5 us is an exemplary error in estimation.

It is to be noted that it is not relevant to the discussion whether $T_{nd}$ that is being measured is a constant or another random variable. If $T_{nd}$ (the network delay) is indeed a constant, then the averaged value of $(T_2-T_1)$ would converge to the actual network delay. If $T_{nd}$ is not a constant, but instead varies from sample to sample, then the averaged value of $(T_2-T_1)$ would converge to the mean of x.

Estimating Noise Mean and Variance

In order to arrive at an accurate estimate of network delay, one needs to estimate the variance of the measurement noise. In order to do so, the delay monitor may periodically sends measurement packets to the ingress and egress network elements, and time-stamps the measurement packets on their way out. The network controller may program the ingress and egress network elements to return the measurement packets back to the delay monitor. When the measurement packets are returned to the delay monitor, the measurement packets are time-stamped again. By measuring the difference between the incoming time stamp and the outgoing time stamp, one can get a sample of the round-trip time. Half of this value corresponds to one sample of measurement noise. By taking repeated measurements, we can estimate the mean and the variance of the measurement noises of $T_{mn2}$ and $T_{mn1}$.

Figure 2:
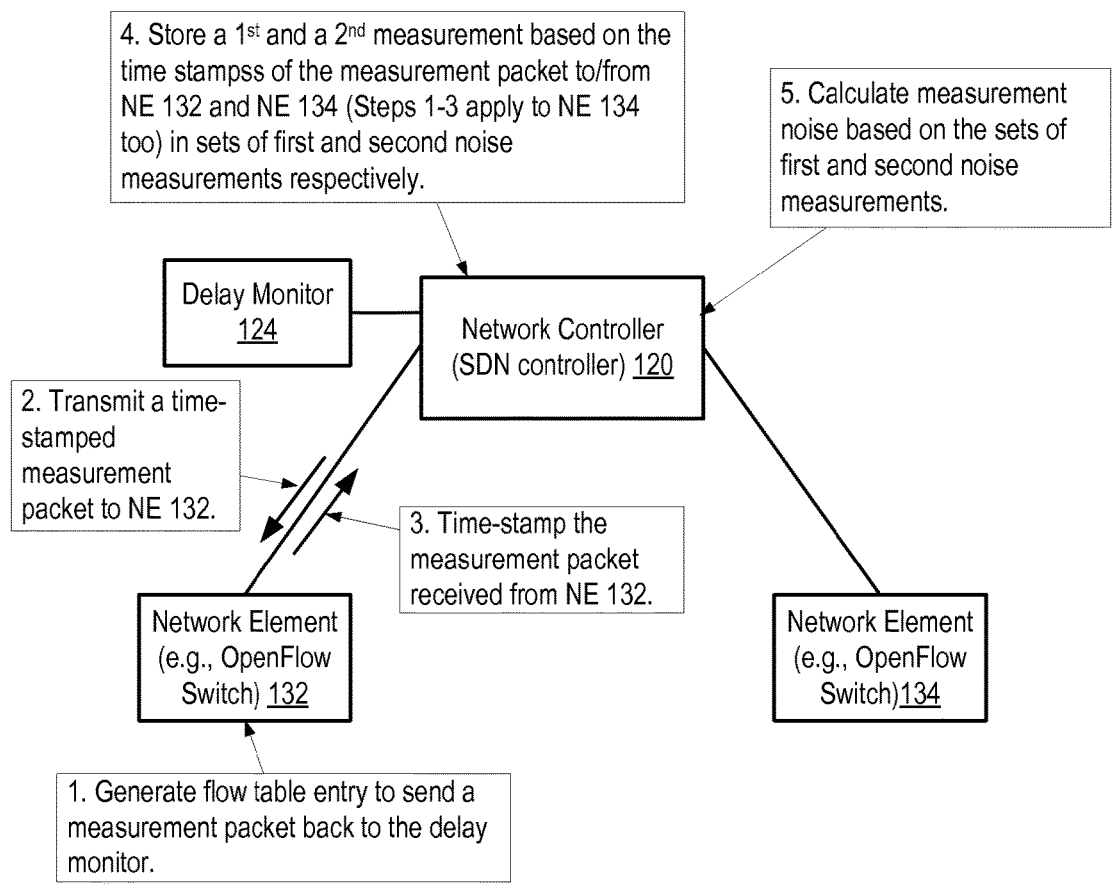
FIG. 2 illustrates operations of estimating noise means and variance according to one embodiment of the invention.

FIG. 2 illustrates operations of estimating noise means and variance according to one embodiment of the invention. FIG. 2 is similar to FIGS. 1A-B and the same or similar references indicate elements or components having the same or similar functionalities. Certain aspects of FIG. 1A-1B have been omitted from FIG. 1A-1B in order to avoid obscuring other aspects of FIG. 2. Task boxes 1 to 5 illustrate the order in which operations are performed according to one embodiment of the invention.

At task box 1, the network element 132 generates a flow table entry, where the flow table entry instructs the network element 132 to send a received measurement packet back to the delay monitor. The measurement packet may be identified by a predetermined header value, e.g., a flow identifier specified to be a particular value. In one embodiment, the flow identifier is a 5-tuple as discussed herein; and in an alternative embodiment, the network element may identify other fields of the packet header. The flow table entry and its associated flow table may be generated based on input from the network controller 120 (e.g., through a flow_mod message or a table-mod message from the network controller 120 as defined in the OpenFlow standards).

At task box 2, the delay monitor 124 causes a time-stamped measurement packet send to the network element 132. The delay monitor 124 may time-stamp the measurement packet prior to exiting the delay monitor 124. Then at task box 3, the network element 132 returns the measurement packet back to the delay monitor 124 as instructed by the generated flow table entry in task box 1, and the delay monitor 124 may time-stamp the measurement packet again. The difference between the two time stamps of the measurement packet is a first measurement of noise, which is the measurement noise between the delay monitor 124 and the network element 132 (e.g., one measure of $T_{mn1}$ discussed herein above).

The steps in task boxes 1-3 can be repeated between the delay monitor 124 and the network element 132, and the second measurement of noise, which is the measurement noise between the delay monitor 124 and the network element 134 (e.g., one measure of $T_{mn2}$ discussed herein above). It is to be noted that the measurement packets for $T_{mn2}$ and $T_{mn1}$ have different identifiers (e.g., specific flow identifiers) so that the delay monitor 124 knows the measurement packets are for measurement noises of which path.

At task box 4, the first and second measurements of noise are stored in sets of first and second noise measurements respectively. The delay monitor 124 may transmit and receive measurement packets to network elements 132 and 134 many times in order to get accurate estimates of the noise measurements, and the sets of first and second noise measurements are the records of the obtained measurements respectively.

At task box 5, the measurement noise for a traffic flow between the network elements 132 and 134 is computed may be computed based on the sets of the first and second noise measurements. Each of the set of noise measurements contains multiple measures. The sufficiency of the number of noise measurement may be determined based on the error in estimation, confidence interval, and the error variance as discussed herein above. With the sufficient number of noise measurements, the measurement noise, the mean and variance of $T_{mn2}-T_{mn1}$ may be obtained.

Figure 3:
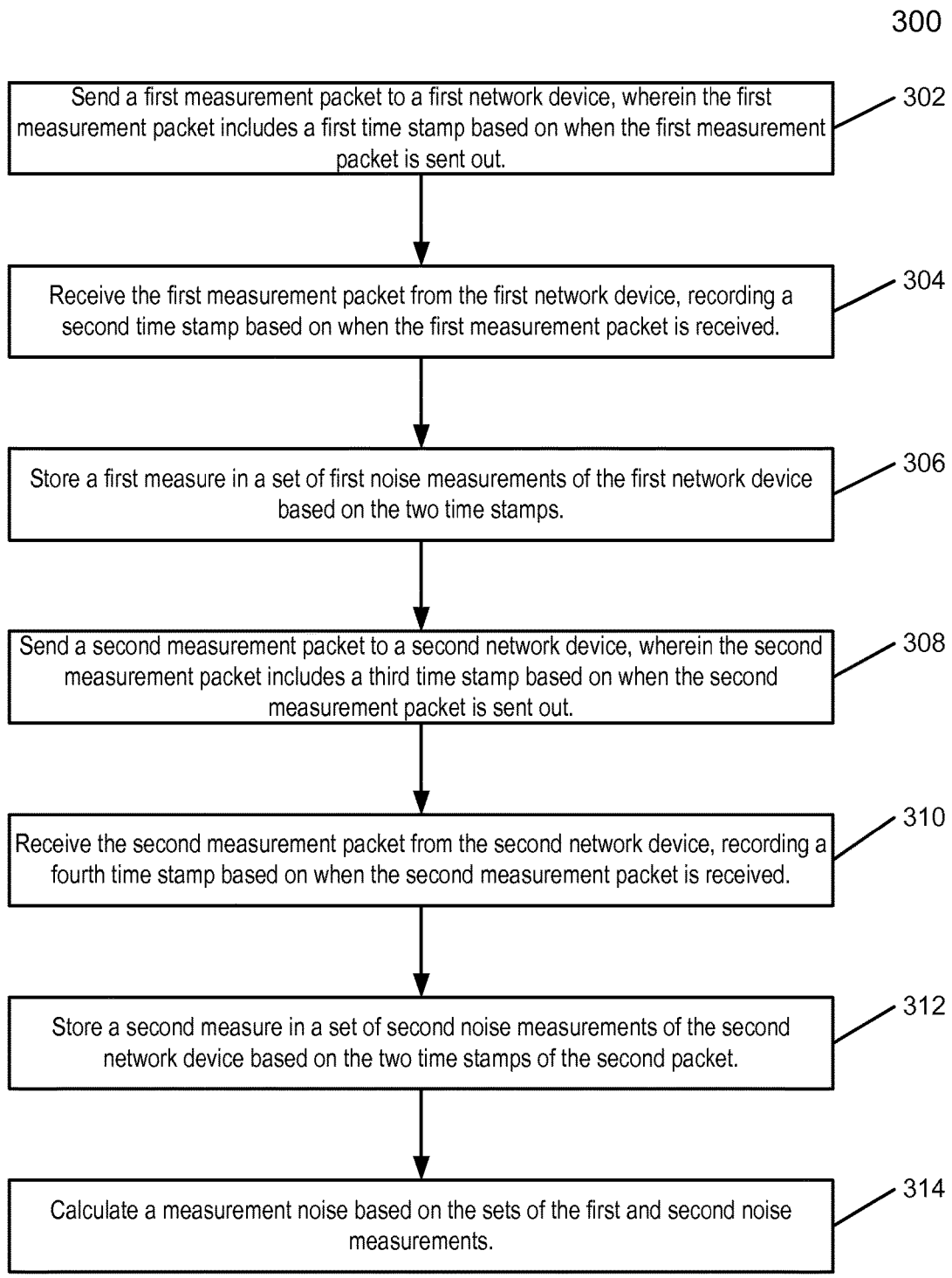
FIG. 3 is a flow diagram illustrating operations of estimating noise means and variance according to one embodiment of the invention.

FIG. 3 is a flow diagram illustrating operations of estimating noise means and variance according to one embodiment of the invention. Method 300 is implemented on an electronic device and the method obtains the noise measurement through calculating time stamp differences using time stamps of measurement packets exchanged between an electronic device (e.g., the one hosting a delay monitor 124) and a first network device (e.g., one implementing the network element 132), and the electronic device and a second network device (e.g., one implementing the network element 134). The electronic device is or coupled to a network controller managing the first and second network device according to one embodiment of the invention.

At reference 302, a first measurement packet is caused to be sent to the first network device. The feature measurement packet includes a time stamp based on when the first measurement is sent out as discussed in relation to FIG. 2. The first measurement packet is then returned to the electronic device.

At reference 304, the first measurement packet is received, and a second time stamp is recorded based on when the first measurement packet is received. Then at reference 306, a first measurement is stored in a set of first noise measurements of the first network device based on the two time stamps.

At references 308-312, the process repeats for the second network device, so that the second measurement is stored in a set of second noise measurements of the second network device based on the time stamps of the second measurement packet as illustrated.

At reference 314, a measurement noise is calculated based on the sets of the first and second noise measurements. The measurement noise includes mean and variance of the measurement noise as discussed in relation to FIG. 2 above.

Identifying Packets for Delay Measurements

For the centralized network delay measurement approach to work properly, the network controller and the delay monitor must be able to identify which packet is for delay measurement. As discussed herein above, such packet may be identified by a context header of the packets transmitted from the network elements, when NSH is supported by the network elements.

In the absence of NSH, packets received from the network elements may be identified based on the 5-tuple (source and destination IP addresses, a protocol type, source and destination TCP/UDP ports) or its equivalence. However, identifying the delay measurement packets based on the 5-tuple and its equivalence is only applicable when the service functions in the service chain that packets traverse do not change the 5-tuple packet. Thus, identification of the delay measurement packets may use other header field of the packets. For example, the differentiated service code point (DSCP) bits in a differentiated services (DS) field in the header of a packet may be used to identify the packet for delay measurements. Typically DSCP bits are not modified by a service function that the packet traverses in a service chain, and many values of DSCP bits are unused in a typical SDN system implementing DSCP bits. The DSCP bits have six bits, thus $2^6=64$ distinct values. Yet, most network elements use only up to eight values for differentiating services. Thus, many values of the DSCP bits may be assigned for the delay measurement purpose.

For example, a DSCP marking on a packet may be changed at the ingress network element to a different value predetermined at the network controller/delay monitor and restored at the egress network element. The translation may be performed on the network element through standard flow tables as discussed and illustrated herein below.

The alternation of the DSCP marking can be made without changing the quality of service (QoS) treatment of packets forwarding along the path in a SDN system as the network elements are aware of the service chain forwarding as the network elements can be programmed to perform QoS on the changed value as required. Additionally, a service chain may be connected via an overlay tunnel (e.g., a virtual extensible LAN, VxLAN). The network elements on the service chain may be programmed by the network controller to translate the special DSCP values for delay measurement in the inner packet headers to the right DSCP values in the outer packet header (e.g., the tunnel header). For the network elements other than the two ends of the tunnel, the outer header is the one determine the packet forwarding.

Selecting Packets for Delay Measurements

In one embodiment of the invention, a copy of every packet that matches a particular traffic flow is transmitted to the delay monitor for time-stamping purpose. The embodiment is suitable for delay measurements over a short period of time (e.g., measuring delay for seconds or minutes). However, some applications require performing delay measurements over a long period of time (e.g., making delay measurements for several minutes or hours). It is not scalable for the delay monitor to process every packet matching the particular traffic flow, thus sampling is deployed in another embodiment of the invention. With sampling, packets of a traffic flow is sampled a predetermined sampling rate at the ingress network element of the traffic flow. The sampled packets are duplicated at the ingress network element and transmitted toward the delay monitor.

The sampling rate may be based on the time period over which the delay measurement needs to be carried. Typically, the short-term delay measurements and long-term delay measurements have different interpretations of network performance (e.g., a short-term delay spike could indicate congest hot spots in a network, while a delay spike in longer-term measurement could indicate capacity/scalability problems of the associated service functions). The sampling rate may be determined by the network controller and/or the delay monitor based on the delay measurement needs in one embodiment.

For sampling packets, in a SDN system supporting NSH, the network platform context field in the NSH metadata can be used to mark the packet. At the ingress network element, one or more bits in the network platform context in NSH of a packet is set to mark the packet to be copied (or have been copied) to be transmitted toward the delay monitor. The rate of the marking is the same as a predetermined sample rate. At the egress network element, the bit in the network platform context in NSH of packets is checked, and if the bit is set, a copy of the packet is transmitted toward the delay monitor.

For a SDN system does not support NSH, the DSCP bits may be used to sample flows. At the ingress network element, a meter is installed for the traffic flow whose delay needs to be measured. The meter rate will be configured to be the sampling rate. Only packets that meet the meter rate are modified with a new DSCP value, and the packet with the new DSCP values are the ones duplicated and transmitted toward the delay monitor. At the network element between the ingress network element and egress network element, the packet classification would not be based on the DSCP value and all the packets transmitted from the ingress network to the egress network element are processed without differentiation. At the egress network element, the packet with the new DSCP values are again duplicated and transmitted toward the delay monitor.

At the delay monitor, as long as the received packets are determined to contain an indication for delay measurement (be it a bit in the network platform context in NSH of the packets or the DSCP values of the packets), the time stamps are recorded, and the delay measurement is calculated based on the time stamps.

It is to be noted that if the delay measurement is required to be performed on only a single traffic flow, then sampling is not needed. All the packets of the single traffic flow may be duplicated and transmitted to the delay monitor, and the delay monitor may identify the packets of the single traffic flow through a 5-tuple or its equivalence (e.g., a flow identifier) without the need to check either the DSCP bits or the NSH of the packets.

The delay measurement to be calculated is the average of delay measurements and not delays experienced by individual packets. Thus, the quantity to be calculated may be expressed in the following equation:

$$\mu(D) = \frac{\sum_{1}^{N} D_i}{N} = \frac{\sum_{1}^{N}(T_i^2 - T_i^1)}{N} = \frac{\sum_{1}^{N}(T_i^2)}{N} - \frac{\sum_{1}^{N}(T_i^1)}{N} = \mu(T_2) - \mu(T_1) \qquad \text{Equation 8}$$

What this implies is that, the average delay faced by a flow in a service chain is nothing but the difference between the average of the timestamp values at the exit and the average of the timestamp values at the entry. Similarly, the Jitter can be shown to be the following:

$$\sigma^2(D) = \sigma^2(T_2) - \sigma^2(T_1) - 2\mu(T_1)\mu(D) - \mu^2(D) \qquad \text{Equation 9}$$

The delay and jitter measurements may be further refined by subtracting the noise components:

$$\mu(T_{nd}) = \mu(D) + \mu(T_{mn1}) - \mu(T_{mn2})) \qquad \text{Equation 10}$$

$$\sigma^2(T_{nd}) = \sigma^2(D) - \sigma^2(T_{mn1} - T_{mn2}) \qquad \text{Equation 11}$$

Operations of the Centralized Network Delay Measurement

Figure 4:
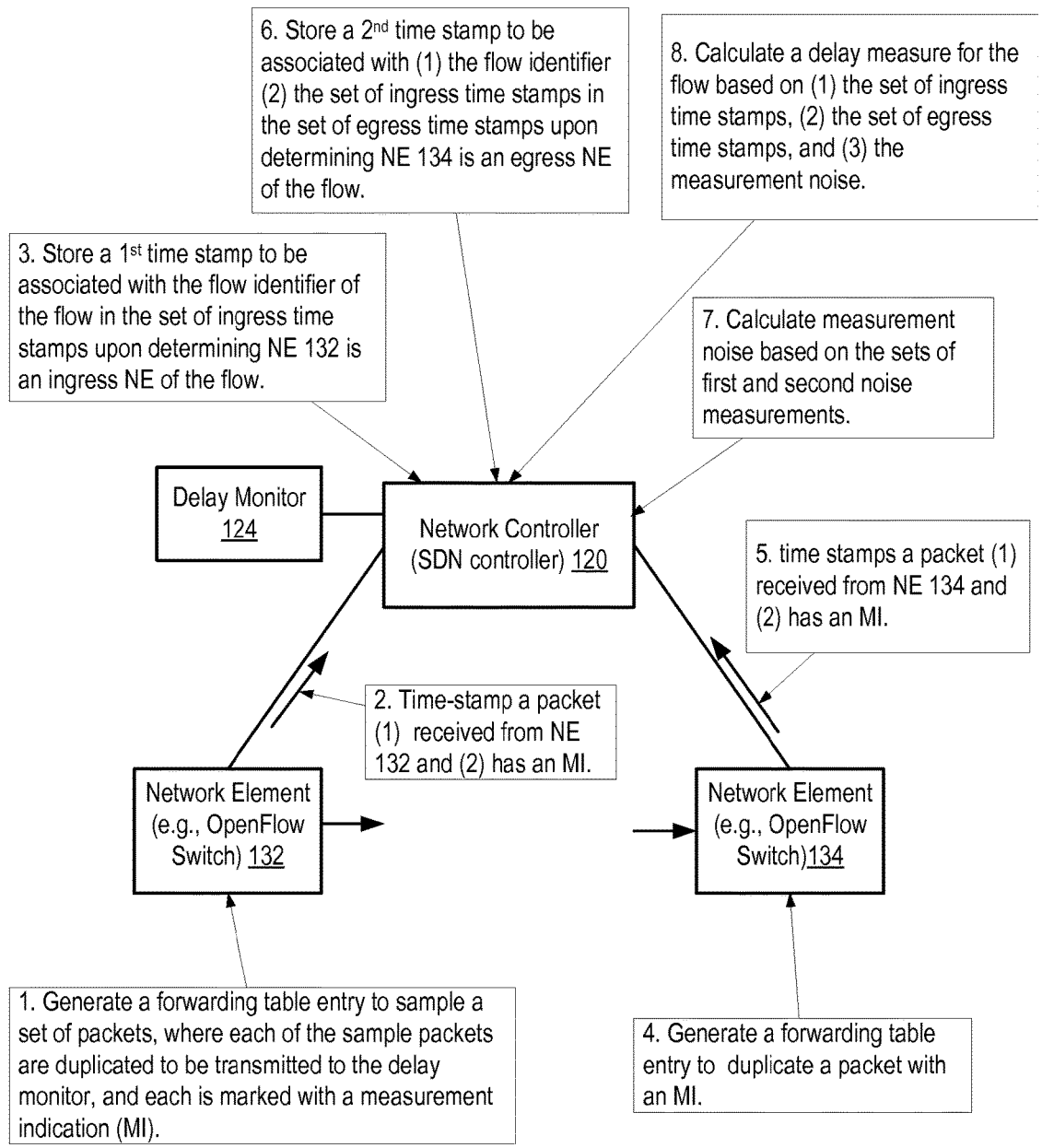
FIG. 4 illustrates the operations of a centralized network delay measurement in a SDN system according to one embodiment of the invention.

FIG. 4 illustrates the operations of a centralized network delay measurement in a SDN system according to one embodiment of the invention. FIG. 4 is similar to FIGS. 1A-B and the same or similar references indicate elements or components having the same or similar functionalities. Certain aspects of FIG. 1A-1B have been omitted from FIG. 1A-1B in order to avoid obscuring other aspects of FIG. 4. Task boxes 1 to 7 illustrate the order in which operations are performed according to one embodiment of the invention.

At task box 1, a forwarding table entry is generated to sample a set of packets of a traffic flow, which has the network element 132 as the ingress network element and the network element 134 as the egress network element. Each of the sample packets are duplicated at the network element 132 to be transmitted to the delay monitor 124, and each is marked with a measurement indication (MI).

As discussed, the measurement indication may be a particular DSCP value. As discussed herein above, a traffic flow typically uses up to eight DSCP values, thus 64−8=56 values are typically available to be set to indicate the sample packets are for delay measurement. In other words, without looking at other header information (e.g., the 5-tuple), the delay monitor can differentiate 56 (or more when less than eight DSCP values are used by traffic flows) concurrently traffic flows to perform delay measurement. In alternative, as discussed, the measurement indication may be set by setting one or more bits in the network platform context in NSH of a packet at the network element 132 when the SDN system supports NSH.

FIG. 5 illustrates exemplary forwarding tables and forwarding table entries for the sampling of packets at an ingress network element according to one embodiment of the invention. Table 1 at reference 502 is a meter, which matches a flow identifier (ID) for identifying a particular traffic flow for which the delay measurement is to be performed. Upon matching, the meter action is to remark the DSCP value of the matching packet and go to table 2. As discussed herein above, the meter rate will be configured to be the sampling rate of the traffic flow. Only the packets meet the meter rate are remarked with the new DSCP value, and other packets of the traffic flow will be processed at table 2 (Action: GoTo table 2) along with the remarked packet.

Table 2 includes three flow table entries, and the higher priority ones (priority=10 in this example) are matched with flow ID, DSCP values. If a packet has the flow ID of the particular traffic flow and the remarked value for delay measurements, a service chain identifier (SC ID) will be set to a particular value (11 in this example); if the packet has the flow ID of the particular traffic flow and the original value, a service chain identifier (SC ID) will be set to another value (10 in this example). Both higher priority flow table entries instruct the matching packets to be processed by table 3. Both higher priority flow table entries also expire in 30 seconds, which is the measurement duration for the particular traffic flow. After the higher priority flow table entries expire, the lower priority flow table entry (priority=1 in this example), which does not expire, sets the SC ID to be 10 and instructs the matching packets to be processed at table 3 at reference 506.

Table 3 includes two flow table entries, and the higher priority one (priority=10 in this example) expires in 30 seconds and is matched with SC ID=11, which was set for packets with the remarked DSCP value. A matching packet will be given a group identifier (GRPID) of 5 and go to a group table 4 at reference 508. The lower priority one (priority=1 in this example) does not expire and is matched with SC ID=10, where a matching packet will be given a GRPID of 4 and go to the group table 4 also for further processing.

Table 4 is a group table, and it includes two group table entries. The higher priority one (priority=10 in this example) expires in 30 seconds and is matched with GRPID=5. The matching packets are the ones for delay measurements, thus the matching packets are sent to two different ports: one port is for regular processing, referred to as a processing port, which causes the packets to be processed at the network element and forwarded on to the next network element; the other port is for delay measuring, referred to as a delay monitor port, which causes the packets to be transmitted to the delay monitor (e.g., the delay monitor 124 in this example). The lower priority one (priority=1 in this example) does not expire and is matched with GRPID=4; the matching packets are sent only to the processing port. Thus, both delay measurement packets and regular packets are processed and forwarded on to the next network element, and the delay measurement packets are also transmitted to the delay monitor for the delay measurements at the ingress network element.

Referring back to FIG. 4, at task box 2, a packet that is received from the network element 132 and have a measurement indication are time-stamped by the delay monitor 124. Then at task box 3, the time stamp value (referred to as the first time stamp) is stored to be associated with the flow identifier of the traffic flow in the set of ingress time stamps, when it is determined that the network element 132 is the ingress network element of the traffic flow. It is to be noted that the network controller 120 manages traffic flow processing in the SDN system, thus it has the knowledge to determine whether the network element 132 is the ingress network element of the traffic flow.

At task box 4, a forwarding table entry is generated to duplicate a received packet of the traffic flow with a measurement indication at the network element 134 as it is an egress network element of the traffic flow. As the egress network element, the network element 134 will finish processing the packets of the traffic flow as the packets are transmitted from the ingress network element. For delay measurement purpose, the sampled packets of the traffic flow are to be duplicated and transmitted to the delay monitor 124 too.

FIG. 6 illustrates exemplary forwarding tables and forwarding table entries for processing the sampled packets at an egress network element according to one embodiment of the invention. The egress network element can be the network element 134 as the network element 134 is the egress network element of the particular traffic flow. Table 1 at reference 602 is a flow table including three table entries. The higher priority ones (priority=10 in this example) are matched with flow ID, DSCP values. If a packet has the flow ID of the particular traffic flow and the remarked value for delay measurements, a service chain identifier (SC ID) will be set to a particular value (12 in this example); if the packet has the flow ID of the particular traffic flow and the original value, a service chain identifier (SC ID) will be set to another value (11 in this example). Both higher priority flow table entries instruct the matching packets to be processed by table 2 at reference 604. Both higher priority flow table entries also expire in 30 seconds, which is the measurement duration for the particular traffic flow. After the higher priority flow table entries expire, the lower priority flow table entry (priority=1 in this example), which does not expire, sets the SC ID to be 10 and instructs the matching packets to table 2.

Table 2 also includes three flow table entries, and the flow table entries matches on the SC ID. The higher priority ones (priority=10 in this example) are matched with SC ID values 11 and 12. A packet matching with SD ID=11 will be given a group identifier (GRPID) of 5 and go to a group table 3 at reference 606; a packet matching with SD ID=12 will be given a GRPID=6 and go to the group table 3 too. Both higher priority flow table entries also expire in 30 seconds, which is the measurement duration for the particular traffic flow. After the higher priority flow table entries expire, the lower priority flow table entry (priority=1 in this example), which does not expire, matches a packet with SD ID=10, set a GRPID of 4 and instructs the matching packets to be processed at table 3 at reference 606.

Table 3 is a group table, and it includes three group table entries. The two higher priority (priority=10 in this example) group table entries expire in 30 seconds and is matched with GRPID values of 5 or 6. The packets matching with GRPID of 6 are the ones for delay measurements, thus the matching packets are sent to two different ports: one port is for regular processing, referred to as an exit port, which causes the packets to complete processing at the egress network element and exit the SDN system; the other port the delay monitor port discussed herein above. Additionally, the packets matching with GRPID of 6 are also remarked with the original DSCP value so that the packets exiting the egress network element will have the same DSCP value that the packets entering the ingress network element with—thus the delay measurement has no impact to the QoS treatment of the particular traffic flow. The packets matching with GRPID of 5 are the packets with DSCP values, and they are sent to the exit port. Other packets matches the lower priority group table entry with GRPID=4, and they are sent to the exit port. Through these forwarding tables and forwarding table entries, the delay measurement packets are transmitted to the delay monitor without impacting the exiting process of the measurement packets and other packets of the particular traffic flow.

Referring back to FIG. 4, at task box 5, a packet that is received from the network element 134 and have a measurement indication are time-stamped by the delay monitor 124. Then at task box 6, the time stamp value (referred to as the second time stamp) is stored to be associated with (1) the flow identifier of the traffic flow and (2) the set of ingress time stamps, in the set of egress time stamps, when it is determined that the network element 134 is the egress network element of the traffic flow.

At task box 7, the measurement noise is calculated based on the sets of the first and second noise measurements as discussed herein above in relation to FIGS. 2 and 3. Then at task box 8, a delay measure for the traffic flow is calculated based on the set of ingress time stamps, the set of egress time stamps, and the measurement noise.

The delay measure of the traffic flow may be the average network delay of the traffic flow. The average network delay may be determined by calculating the following:

$$\mu(T_{nd}) = \mu(T_2 - T_1 + T_{mn1} - T_{mn2}) = \mu(T_2) - \mu(T_1) + \mu(T_{mn1}) - \mu(T_{mn2}))$$ Equation 12

Where $\mu(.)$ represent the average value of the variable. Note that $\mu(T_1)$ and $\mu(T_2)$ can be calculated by averaging the values of the sets of ingress and egress time stamps respectively; $\mu(T_{mn1})$ and $\mu(T_{mn2})$ can be calculated by averaging the values of the sets of first and second noise measurements respectively.

When $(T_2-T_1)$ has no noise components, the variance of $(T_2-T_1)$ measures jitter, and the delay measure of the traffic flow is the jitter of the traffic flow. When the noise component is involved, the variance of $(T_2-T_1)$ would also include the variance of the noise. In order to get a better estimate of the jitter, the variance of $T_{nd}$ may be determined by calculating the following:

$$\sigma^2(T_{nd}) = \sigma^2(T_2-T_1) - \sigma^2(T_{mn1}-T_{mn2})$$ Equation 13 where $\sigma^2(.)$ is the variance of the components.

Through the processes discussed herein above, embodiments of the invention uses existing forwarding table constructs to forward copies of packets of traffic flows to a delay monitor to time-stamp the packets' entry and exit time. Using the time stamps and results from probability deduction, the estimates for mean and variance of delay measures may be derived. The embodiments measure delays of actual packets processed by the network elements (instead of a test stream separately generated) and do not require any special enhancement to the existing SDN standards such as the OpenFlow standards. Additionally, the embodiments do not require time synchronization across various network elements in a SDN system. Furthermore, some embodiments of the invention use sampling technique (e.g., through using unused DSCP values) to solve the scalability problem associated with delay measurement over long period of time. Thus, the embodiments of the invention utilize a centralized network delay measurement approach and make the delay measurement in a SDN system efficient and scalable.

Additional Diagrams for the Centralized Network Delay Measurement

Figure 7:
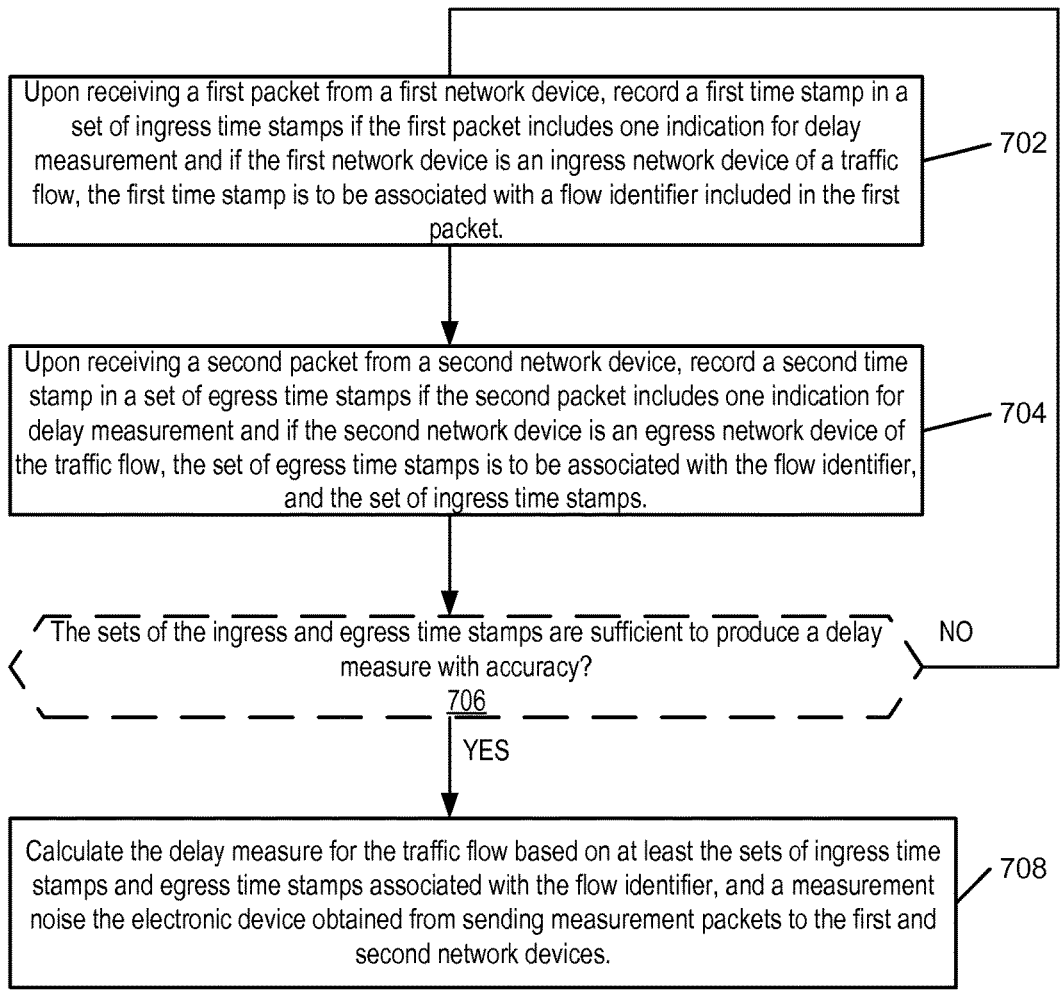
FIG. 7 is a flow diagram illustrating operations of centralized network delay measurement according to one embodiment of the invention.

FIG. 7 is a flow diagram illustrating operations of centralized network delay measurement according to one embodiment of the invention. Method 700 may be implemented in the delay monitor 124 discussed herein above, where the delay monitor may be hosted in an electronic device of a SDN system includes a SDN controller and a plurality of network elements. The SDN controller and the plurality of network elements are implemented in network devices.

At reference 702, upon receiving a first packet from a first network device, a first time stamp is recorded in a set of ingress time stamps if the first packet includes one indication for delay measurement and if the first network device is an ingress network device of a flow. The first time stamp is to be associated with a flow identifier included in the first packet.

At reference 704, upon receiving a second packet from a second network device, record a second time stamp in a set of egress time stamps if the second packet includes one indication for delay measurement and if the second network device is an egress network device of the flow. The set of egress time stamps is to be associated with the flow identifier, and the set of ingress time stamps.

In one embodiment, the indication for delay measurement is obtained from differentiated service code point (DSCP) bits in a differentiated services (DS) field in headers of the first and second packets. In one embodiment, the delay monitor calculates a plurality of delay measures for a plurality of traffic flows in the SDN system, wherein each traffic flow is identified with a different value represented by the DSCP bits.

In one embodiment, the indication for delay measurement is obtained from a context in header of the first and second packets when both the first and second network devices support network service header (NSH).

In one embodiment, the first packet is duplicated from one packet forwarded by the first network device and destined to the second network device. The second packet is duplicated from one packet sourced from the first network device in the second network device.

Optionally at reference 706, it is determined whether the sets of the ingress and egress time stamps are sufficient to produce a delay measure with accuracy. The accuracy may be a required accuracy with certain boundaries. For example, the determination may include comparing the number of ingress and egress time stamps in the sets of the ingress and egress time stamps with a threshold number, and if the number of time stamps exceeds the threshold number, the number is deemed sufficient to make an accurate estimate of the delay measure. The threshold number is determined using an error range (e.g., error in estimate being 5 us in the example herein above), a confidence interval that an error of the delay measure outside of the error range is within a probability (99% within the error range of 5 us in the example herein above).

If the sets of the ingress and egress timestamps are insufficient to produce the delay measure with accuracy, the flow goes back to reference 702. Otherwise, the flow goes to reference 708, where the delay measure is calculated for the traffic flow based on at least the sets of the ingress time stamps and egress time stamps associated with the flow identifier, and a measurement noise the delay monitor obtained from sending measurement packets to the first and second network devices. The formula used to calculate the delay measure in one embodiment is discussed herein above with relation to FIG. 4. Also, the measurement noise is obtained through calculating time stamp differences using time stamps of measurement packets exchanged between the delay monitor and the first network device, and the delay monitor and the second network device discussed herein above with relation to FIGS. 2-3.

Figure 8:
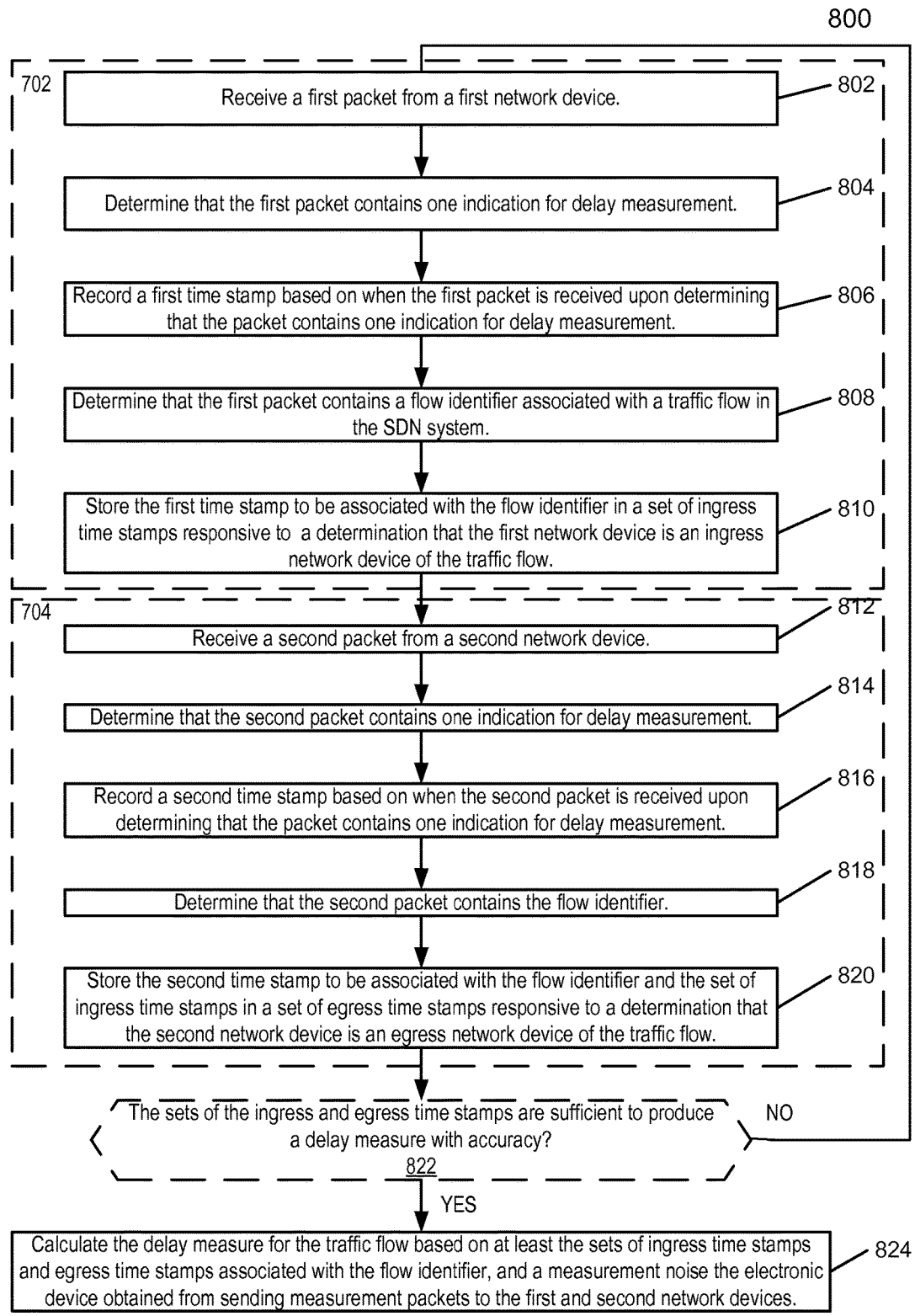
FIG. 8 is another flow diagram illustrating operations of centralized network delay measurement according to one embodiment of the invention.

FIG. 8 is another flow diagram illustrating operations of centralized network delay measurement according to one embodiment of the invention. FIG. 8 is one implementation of FIG. 7: The reference 702 is implemented as references 802-810, the reference 704 is implemented as references 812-820; and references 822 and 824 are the same as references 706 and 708. Thus, the difference between FIGS. 8 and 7 are discussed herein below.

At reference 802, a first packet is received from a first network device. Then at reference 804, it is determined that the first packet contains one indication for delay measurement. A first time stamp is then recorded based on when the first packet is received upon determining that the first packet contains one indication for delay measurement at reference 806. At reference 808, it is determined that the first packet contains a flow identifier associated with a traffic flow in the SDN system. Then at reference 810, the first time stamp is stored to be associated with the flow identifier in a set of ingress timestamps responsive to a determination that the first network device is an ingress network device of the traffic flow.

At reference 812, a second packet is received from a second network device different from the first network device. At reference 814, it is determined that the second packet contains one indication for delay measurement. A second time stamp is then recorded based on when the second packet is received upon determining that the second packet contains one indication for delay measurement at reference 816. At reference 818, it is determined that the second packet contains the flow identified associated with the traffic flow. Then at reference 820, the second time stamp is stored in a set of egress time stamps to be associated with the flow identifier and the set of ingress time stamps responsive to a determination that the second network device is an egress network device of the traffic flow.

While FIG. 8 illustrates one way to implement references 702 and 704, other ways exists to implement references 702 and 704. Also, it is to be noted that the delay measure is not limited to a traffic flow going through service chains as the operations within the delay monitor can time-stamp packets of traffic flows and determine the delay measure without being aware of any service chain the packets may traverse through.

SDN and NFV Environment Utilizing Embodiments of the Invention

Embodiments of the invention may be utilized in a SDN and NFV network containing network devices. A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

FIG. 9A illustrates connectivity between network devices (NDs) within an exemplary network, as well as three exemplary implementations of the NDs, according to some embodiments of the invention. FIG. 9A shows NDs 900A-H and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 900A, E, and F illustrates that these NDs act as ingress and egress points for the network (and thus, these NDs are sometimes referred to as edge NDs; while the other NDs may be called core NDs).

Two of the exemplary ND implementations in FIG. 9A are: 1) a special-purpose network device 902 that uses custom application-specific integrated-circuits (ASICs) and a proprietary operating system (OS); and 2) a general purpose network device 904 that uses common off-the-shelf (COTS) processors and a standard OS.

The special-purpose network device 902 includes networking hardware 910 comprising compute resource(s) 912 (which typically include a set of one or more processors), forwarding resource(s) 914 (which typically include one or more ASICs and/or network processors), and physical network interfaces (NIs) 916 (sometimes called physical ports), as well as non-transitory machine readable storage media 918 having stored therein networking software 920, which includes the delay monitoring agent (DMA) 152 (or DMA 162) discussed herein above. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 900A-H. During operation, the networking software 920 may be executed by the networking hardware 910 to instantiate a set of one or more networking software instance(s) 922. Each of the networking software instance(s) 922, and that part of the networking hardware 910 that executes that network software instance (be it hardware dedicated to that networking software instance and/or time slices of hardware temporally shared by that networking software instance with others of the networking software instance(s) 922), form a separate virtual network element 930A-R. Each of the virtual network element(s) (VNEs) 930A-R includes a control communication and configuration module 932A-R (sometimes referred to as a local control module or control communication module) and forwarding table(s) 934A-R, such that a given virtual network element (e.g., 930A) includes the control communication and configuration module (e.g., 932A), a set of one or more forwarding table(s) (e.g., 934A), and that portion of the networking hardware 910 that executes the virtual network element (e.g., 930A). The control communication and configuration module 932A-R include DMA instances 921A-R respectively.

The special-purpose network device 902 is often physically and/or logically considered to include: 1) a ND control plane 924 (sometimes referred to as a control plane) comprising the compute resource(s) 912 that execute the control communication and configuration module(s) 932A-R; and 2) a ND forwarding plane 926 (sometimes referred to as a forwarding plane, a data plane, or a media plane) comprising the forwarding resource(s) 914 that utilize the forwarding table(s) 934A-R and the physical NIs 916. By way of example, where the ND is a router (or is implementing routing functionality), the ND control plane 924 (the compute resource(s) 912 executing the control communication and configuration module(s) 932A-R) is typically responsible for participating in controlling how data (e.g., packets) is to be routed (e.g., the next hop for the data and the outgoing physical NI for that data) and storing that routing information in the forwarding table(s) 934A-R, and the ND forwarding plane 926 is responsible for receiving that data on the physical NIs 916 and forwarding that data out the appropriate ones of the physical NIs 916 based on the forwarding table(s) 934A-R.

FIG. 9B illustrates an exemplary way to implement the special-purpose network device 902 according to some embodiments of the invention. FIG. 9B shows a special-purpose network device including cards 938 (typically hot pluggable). While in some embodiments the cards 938 are of two types (one or more that operate as the ND forwarding plane 926 (sometimes called line cards), and one or more that operate to implement the ND control plane 924 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 936 (e.g., a first full mesh coupling the line cards and a second full mesh coupling all of the cards).

Returning to FIG. 9A, the general purpose network device 904 includes hardware 940 comprising a set of one or more processor(s) 942 (which are often COTS processors) and network interface controller(s) 944 (NICs; also known as network interface cards) (which include physical NIs 946), as well as non-transitory machine readable storage media 948 having stored therein software 950. During operation, the processor(s) 942 execute the software 950 to instantiate one or more sets of one or more applications 964A-R. While one embodiment does not implement virtualization, alternative embodiments may use different forms of virtualization—represented by a virtualization layer 954 and software containers 962A-R. For example, one such alternative embodiment implements operating system-level virtualization, in which case the virtualization layer 954 represents the kernel of an operating system (or a shim executing on a base operating system) that allows for the creation of multiple software containers 962A-R that may each be used to execute one of the sets of applications 964A-R. In this embodiment, the multiple software containers 962A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 954 represents a hypervisor (sometimes referred to as a virtual machine monitor (VMM)) or a hypervisor executing on top of a host operating system; and 2) the software containers 962A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 964A-R, as well as the virtualization layer 954 and software containers 962A-R if implemented, are collectively referred to as software instance(s) 952. Each set of applications 964A-R, corresponding software container 962A-R if implemented, and that part of the hardware 940 that executes them (be it hardware dedicated to that execution and/or time slices of hardware temporally shared by software containers 962A-R), forms a separate virtual network element(s) 960A-R.

The virtual network element(s) 960A-R perform similar functionality to the virtual network element(s) 930A-R—e.g., similar to the control communication and configuration module(s) 932A and forwarding table(s) 934A (this virtualization of the hardware 940 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 962A-R differently. For example, while embodiments of the invention are illustrated with each software container 962A-R corresponding to one VNE 960A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 962A-R to VNEs also apply to embodiments where such a finer level of granularity is used.

In certain embodiments, the virtualization layer 954 includes a virtual switch that provides similar forwarding services as a physical Ethernet switch. Specifically, this virtual switch forwards traffic between software containers 962A-R and the NIC(s) 944, as well as optionally between the software containers 962A-R; in addition, this virtual switch may enforce network isolation between the VNEs 960A-R that by policy are not permitted to communicate with each other (e.g., by honoring virtual local area networks (VLANs)).

The third exemplary ND implementation in FIG. 9A is a hybrid network device 906, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 902) could provide for para-virtualization to the networking hardware present in the hybrid network device 906.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 930A-R, VNEs 960A-R, and those in the hybrid network device 906) receives data on the physical NIs (e.g., 916, 946) and forwards that data out the appropriate ones of the physical NIs (e.g., 916, 946). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

Figure 9C:
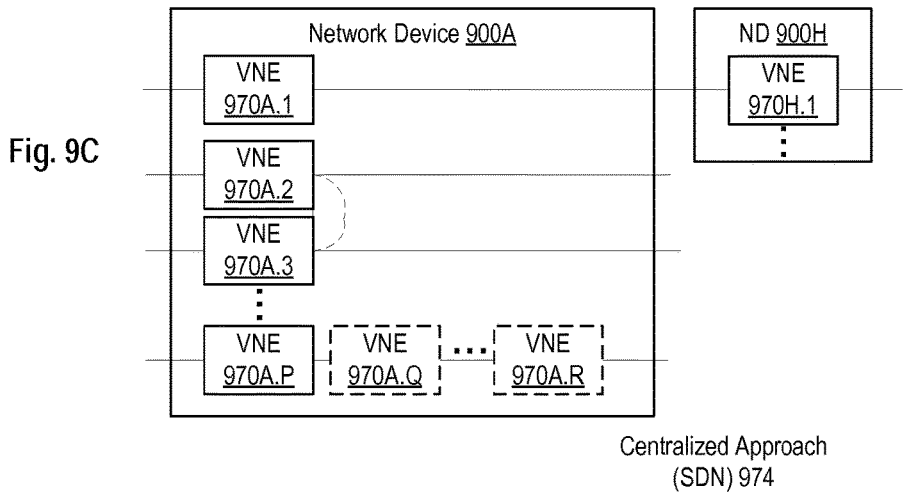
FIG. 9C illustrates various exemplary ways in which virtual network elements (VNEs) may be coupled according to some embodiments of the invention.

FIG. 9C illustrates various exemplary ways in which VNEs may be coupled according to some embodiments of the invention. FIG. 9C shows VNEs 970A.1-970A.P (and optionally VNEs 970A.Q-970A.R) implemented in ND 900A and VNE 970H.1 in ND 900H. In FIG. 9C, VNEs 970A.1-P are separate from each other in the sense that they can receive packets from outside ND 900A and forward packets outside of ND 900A; VNE 970A.1 is coupled with VNE 970H.1, and thus they communicate packets between their respective NDs; VNE 970A.2-970A.3 may optionally forward packets between themselves without forwarding them outside of the ND 900A; and VNE 970A.P may optionally be the first in a chain of VNEs that includes VNE 970A.Q followed by VNE 970A.R (this is sometimes referred to as dynamic service chaining, where each of the VNEs in the series of VNEs provides a different service—e.g., one or more layer 4-7 network services). While FIG. 9C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 9A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 9A may also host one or more such servers (e.g., in the case of the general purpose network device 904, one or more of the software containers 962A-R may operate as servers; the same would be true for the hybrid network device 906; in the case of the special-purpose network device 902, one or more such servers could also be run on a virtualization layer executed by the compute resource(s) 912); in which case the servers are said to be co-located with the VNEs of that ND.

A virtual network is a logical abstraction of a physical network (such as that in FIG. 9A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 9D:
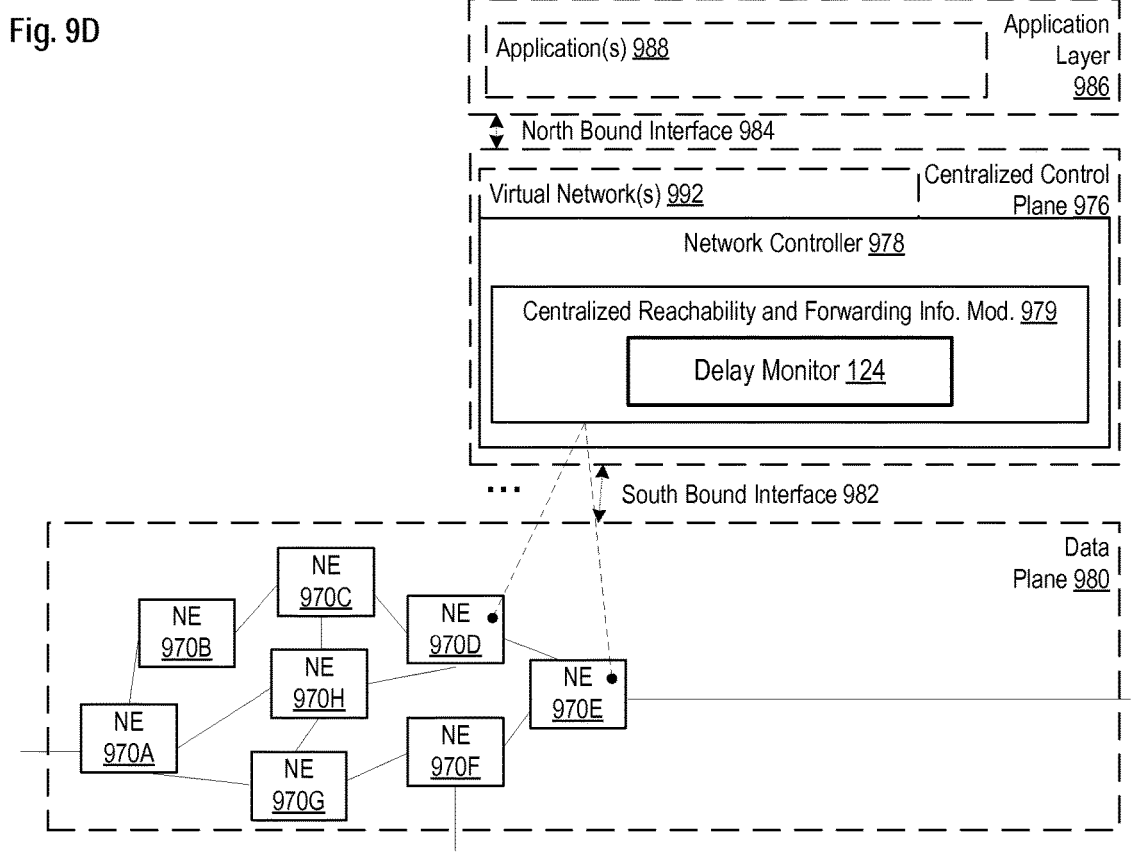
FIG. 9D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 9D illustrates that a centralized approach 974 (also known as software defined networking (SDN)) that decouples the system that makes decisions about where traffic is sent from the underlying systems that forwards traffic to the selected destination. The illustrated centralized approach 974 has the responsibility for the generation of reachability and forwarding information in a centralized control plane 976 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 976 has a south bound interface 982 with a data plane 980 (sometime referred to the infrastructure layer, network forwarding plane, or forwarding plane (which should not be confused with a ND forwarding plane)) that includes the NEs 970A-H (sometimes referred to as switches, forwarding elements, data plane elements, or nodes). The centralized control plane 976 includes a network controller 978, which includes a centralized reachability and forwarding information module 979 that determines the reachability within the network and distributes the forwarding information to the NEs 970A-H of the data plane 980 over the south bound interface 982 (which may use the OpenFlow protocol). Thus, the network intelligence is centralized in the centralized control plane 976 executing on electronic devices that are typically separate from the NDs. The centralized reachability and forwarding information module 979 contains the delay monitor 124 as illustrated in, and described with reference to FIGS. 1-8.

For example, where the special-purpose network device 902 is used in the data plane 980, each of the control communication and configuration module(s) 932A-R of the ND control plane 924 typically include a control agent that provides the VNE side of the south bound interface 982. In this case, the ND control plane 924 (the compute resource(s) 912 executing the control communication and configuration module(s) 932A-R) performs its responsibility for participating in controlling how data (e.g., packets) is to be routed (e.g., the next hop for the data and the outgoing physical NI for that data) through the control agent communicating with the centralized control plane 976 to receive the forwarding information (and in some cases, the reachability information) from the centralized reachability and forwarding information module 979 (it should be understood that in some embodiments of the invention, the control communication and configuration module(s) 932A-R, in addition to communicating with the centralized control plane 976, may also play some role in determining reachability and/or calculating forwarding information—albeit less so than in the case of a distributed approach; such embodiments are generally considered to fall under the centralized approach 974, but may also be considered a hybrid approach).

While the above example uses the special-purpose network device 902, the same centralized approach 974 can be implemented with the general purpose network device 904 (e.g., each of the VNE 960A-R performs its responsibility for controlling how data (e.g., packets) is to be routed (e.g., the next hop for the data and the outgoing physical NI for that data) by communicating with the centralized control plane 976 to receive the forwarding information (and in some cases, the reachability information) from the centralized reachability and forwarding information module 979; it should be understood that in some embodiments of the invention, the VNEs 960A-R, in addition to communicating with the centralized control plane 976, may also play some role in determining reachability and/or calculating forwarding information—albeit less so than in the case of a distributed approach) and the hybrid network device 906. In fact, the use of SDN techniques can enhance the NFV techniques typically used in the general purpose network device 904 or hybrid network device 906 implementations as NFV is able to support SDN by providing an infrastructure upon which the SDN software can be run, and NFV and SDN both aim to make use of commodity server hardware and physical switches.

FIG. 9D also shows that the centralized control plane 976 has a north bound interface 984 to an application layer 986, in which resides application(s) 988. The centralized control plane 976 has the ability to form virtual networks 992 (sometimes referred to as a logical forwarding plane, network services, or overlay networks (with the NEs 970A-H of the data plane 980 being the underlay network)) for the application(s) 988. Thus, the centralized control plane 976 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 9D illustrates the simple case where each of the NDs 900A-H implements a single NE 970A-H, it should be understood that the network control approaches described with reference to FIG. 9D also work for networks where one or more of the NDs 900A-H implement multiple VNEs (e.g., VNEs 930A-R, VNEs 960A-R, those in the hybrid network device 906). Alternatively or in addition, the network controller 978 may also emulate the implementation of multiple VNEs in a single ND. Specifically, instead of (or in addition to) implementing multiple VNEs in a single ND, the network controller 978 may present the implementation of a VNE/NE in a single ND as multiple VNEs in the virtual networks 992 (all in the same one of the virtual network(s) 992, each in different ones of the virtual network(s) 992, or some combination). For example, the network controller 978 may cause an ND to implement a single VNE (a NE) in the underlay network, and then logically divide up the resources of that NE within the centralized control plane 976 to present different VNEs in the virtual network(s) 992 (where these different VNEs in the overlay networks are sharing the resources of the single VNE/NE implementation on the ND in the underlay network).

Figure 9E:
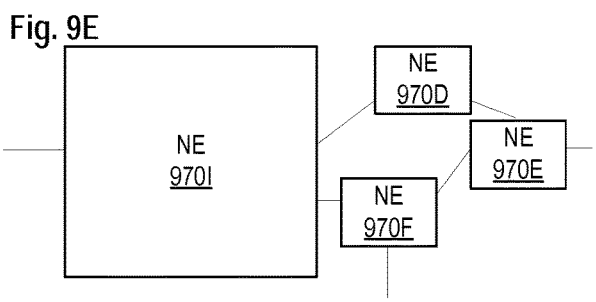
FIG. 9E illustrates the simple case of where each of the NDs implements a single NE, but a centralized control plane has abstracted multiple of the NEs in different NDs into (to represent) a single NE in one of the virtual network(s), according to some embodiments of the invention.
Figure 9F:
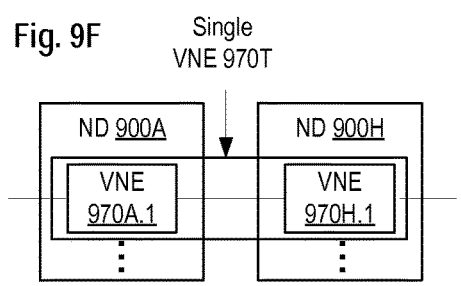
FIG. 9F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 9E and 9F respectively illustrate exemplary abstractions of NEs and VNEs that the network controller 978 may present as part of different ones of the virtual networks 992. FIG. 9E illustrates the simple case of where each of the NDs 900A-H implements a single NE 970A-H (see FIG. 9D), but the centralized control plane 976 has abstracted multiple of the NEs in different NDs (the NEs 970A-C and G-H) into (to represent) a single NE 9701 in one of the virtual network(s) 992 of FIG. 9D, according to some embodiments of the invention. FIG. 9E shows that in this virtual network, the NE 9701 is coupled to NE 970D and 970F, which are both still coupled to NE 970E.

FIG. 9F illustrates a case where multiple VNEs (VNE 970A.1 and VNE 970H.1) are implemented on different NDs (ND 900A and ND 900H) and are coupled to each other, and where the centralized control plane 976 has abstracted these multiple VNEs such that they appear as a single VNE 970T within one of the virtual networks 992 of FIG. 9D, according to some embodiments of the invention. Thus, the abstraction of a NE or VNE can span multiple NDs.

While some embodiments of the invention implement the centralized control plane 976 as a single entity (e.g., a single instance of software running on a single electronic device), alternative embodiments may spread the functionality across multiple entities for redundancy and/or scalability purposes (e.g., multiple instances of software running on different electronic devices).

Figure 10:
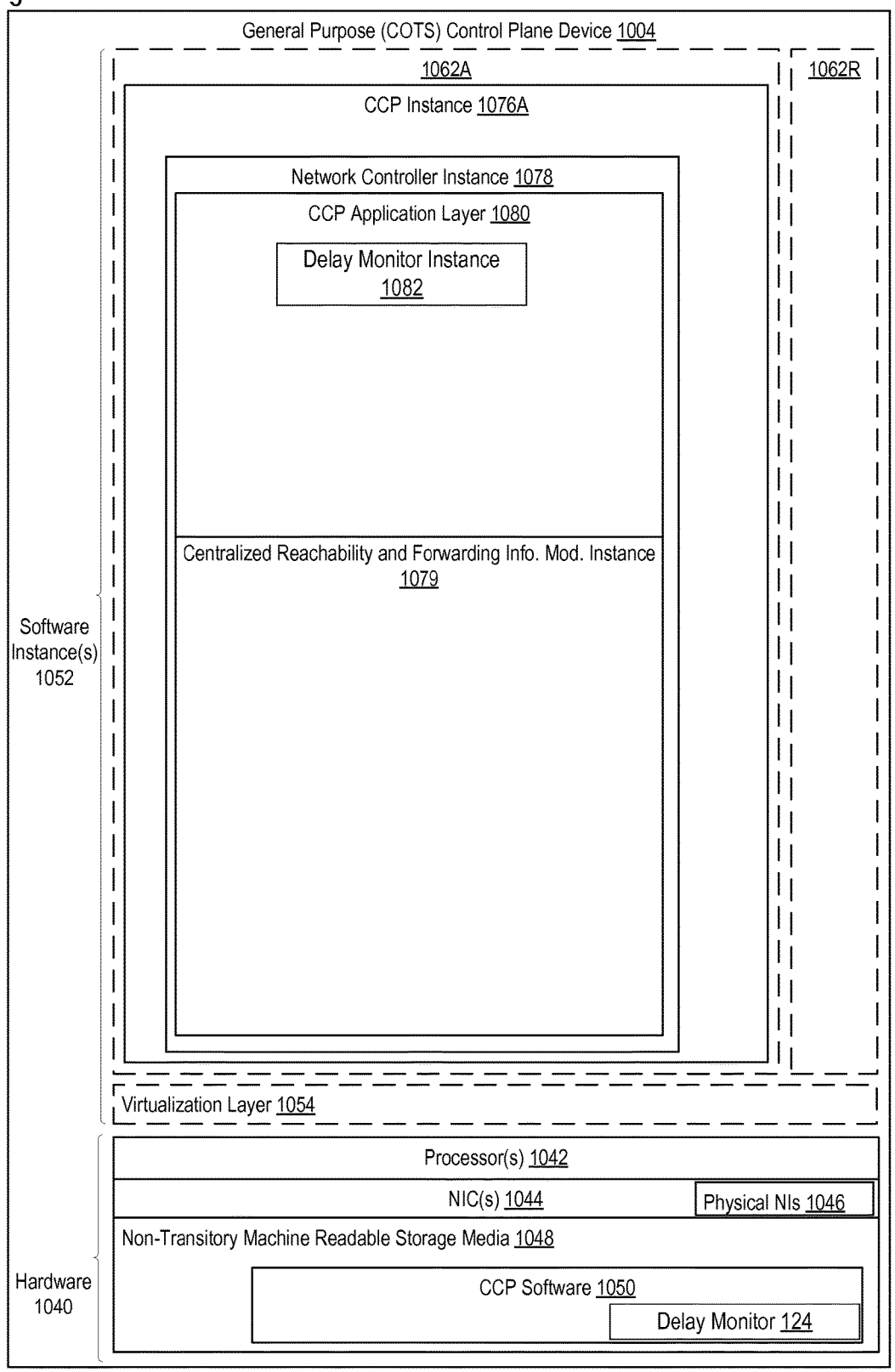
FIG. 10 illustrates a general purpose control plane device with centralized control plane (CCP) software 1050), according to some embodiments of the invention.

Similar to the network device implementations, the electronic device(s) running the centralized control plane 976, and thus the network controller 978 including the centralized reachability and forwarding information module 979, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 10 illustrates, a general purpose control plane device 1004 including hardware 1040 comprising a set of one or more processor(s) 1042 (which are often COTS processors) and network interface controller(s) 1044 (NICs; also known as network interface cards) (which include physical NIs 1046), as well as non-transitory machine readable storage media 1048 having stored therein centralized control plane (CCP) software 1050.

In embodiments that use compute virtualization, the processor(s) 1042 typically execute software to instantiate a virtualization layer 1054 and software container(s) 1062A-R (e.g., with operating system-level virtualization, the virtualization layer 1054 represents the kernel of an operating system (or a shim executing on a base operating system) that allows for the creation of multiple software containers 1062A-R (representing separate user space instances and also called virtualization engines, virtual private servers, or jails) that may each be used to execute a set of one or more applications; with full virtualization, the virtualization layer 1054 represents a hypervisor (sometimes referred to as a virtual machine monitor (VMM)) or a hypervisor executing on top of a host operating system, and the software containers 1062A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 1050 (illustrated as CCP instance 1076A) is executed within the software container 1062A on the virtualization layer 1054. In embodiments where compute virtualization is not used, the CCP instance 1076A on top of a host operating system is executed on the "bare metal" general purpose control plane device 1004. The instantiation of the CCP instance 1076A, as well as the virtualization layer 1054 and software containers 1062A-R if implemented, are collectively referred to as software instance(s) 1052. The CCP software 1050 includes delay monitor 124 discussed herein above, and one or more delay monitor instances 1082 is instantiated in the CCP application layer 1080.

In some embodiments, the CCP instance 1076A includes a network controller instance 1078. The network controller instance 1078 includes a centralized reachability and forwarding information module instance 1079 (which is a middleware layer providing the context of the network controller 978 to the operating system and communicating with the various NEs), and an CCP application layer 1080 (sometimes referred to as an application layer) over the middleware layer (providing the intelligence required for various network operations such as protocols, network situational awareness, and user—interfaces). At a more abstract level, this CCP application layer 1080 within the centralized control plane 976 works with virtual network view(s) (logical view(s) of the network) and the middleware layer provides the conversion from the virtual networks to the physical view The centralized control plane 976 transmits relevant messages to the data plane 980 based on CCP application layer 1080 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 980 may receive different messages, and thus different forwarding information. The data plane 980 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 980, the packet (or a subset of the packet header and content) is typically forwarded to the centralized control plane 976. The centralized control plane 976 will then program forwarding table entries into the data plane 980 to accommodate packets belonging to the flow of the unknown packet. Once a specific forwarding table entry has been programmed into the data plane 980 by the centralized control plane 976, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Each VNE (e.g., a virtual router, a virtual bridge (which may act as a virtual switch instance in a Virtual Private LAN Service (VPLS) (RFC 4761 and 4762) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

The operations of the flow diagram FIG. 6 are described with reference to the exemplary embodiment of FIGS. 2-5 and 7A-F. However, it should be understood that the operations of flow diagrams can be performed by embodiments of the invention other than those discussed with reference to the exemplary embodiment of FIGS. 2-5 and 7A-F, and the exemplary embodiment of FIGS. 2-5 and 7A-F can perform operations different than those discussed with reference to the flow diagram of FIG. 6.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end system, a network device). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented in an electronic device coupled to a software-defined networking (SDN) system, wherein the SDN system includes a SDN controller managing a plurality of network devices, the method comprising:
  upon receiving a first packet of a first network device of the plurality of network devices, recording a first time stamp in a set of ingress time stamps if the first packet includes one indication for delay measurement and if the first network device is an ingress network device of a traffic flow, wherein the first time stamp is to be associated with a flow identifier included in the first packet;
  upon receiving a second packet of a second network device of the plurality of network devices, recording a second time stamp in a set of egress time stamps if the second packet includes one indication for delay measurement and if the second network device is an egress network device of the traffic flow, wherein the set of egress time stamps is to be associated with the flow identifier, and the set of ingress time stamps; and
  calculating a delay measure for the traffic flow based on at least the sets of the ingress time stamps and egress time stamps associated with the flow identifier, and a measurement noise the electronic device obtained from sending measurement packets to the first and second network devices.

2. The method of claim 1, further comprising:
  determining that the sets of the ingress and egress time stamps are sufficient to produce the delay measure with accuracy prior to calculating the delay measure.

3. The method of claim 2, wherein the determining includes comparing a number of ingress and egress time stamps in the sets with a threshold number, and wherein the threshold number is determined using an error range, a confidence interval that an error of the delay measure outside of the error range is within a probability.

4. The method of claim 1, wherein the indication for delay measurement is obtained from differentiated service code point (DSCP) bits in a differentiated services (DS) field in headers of the first and second packets.

5. The method of claim 4, wherein the electronic device calculates a plurality of delay measures for a plurality of traffic flows in the SDN system, wherein each traffic flow is identified with a different value represented by the DSCP bits.

6. The method of claim 1, wherein the indication for delay measurement is obtained from a context in header of the first and second packets when both the first and second network devices support network service header (NSH).

7. The method of claim 1, wherein the first packet is duplicated from one packet forwarded by the first network device and destined to the second network device, and wherein the second packet is duplicated from the one packet received from the first network device.

8. The method of claim 1, wherein the measurement noise is obtained through calculating time stamp differences using time stamps of measurement packets exchanged between the electronic device and the first network device, and the electronic device and the second network device.

9. The method of claim 1, wherein the electronic device is a SDN controller of the SDN system.

10. The method of claim 1, wherein the electronic device runs a software application of the SDN system to perform the method.

11. An electronic device, to be coupled to a software-defined networking (SDN) system, wherein the SDN system includes a SDN controller managing a plurality of network devices, the electronic device comprising:
a processor and a non-transitory machine-readable storage medium coupled to the processor, the non-transitory machine-readable storage medium containing operations executable by the processor, wherein the electronic device is operative to:
upon receiving a first packet of a first network device of the plurality of network devices, record a first time stamp in a set of ingress time stamps if the first packet includes one indication for delay measurement and if the first network device is an ingress network device of a traffic flow, wherein the first time stamp is to be associated with a flow identifier included in the first packet,
upon receiving a second packet of a second network device of the plurality of network devices, record a second time stamp in a set of egress time stamps if the second packet includes one indication for delay measurement and if the second network device is an egress network device of the traffic flow, wherein the set of egress time stamps is to be associated with the flow identifier, and the set of ingress time stamps, and
calculate a delay measure for the traffic flow based on at least the sets of the ingress time stamps and egress time stamps associated with the flow identifier, and a measurement noise the electronic device obtained from sending measurement packets to the first and second network devices.

12. The electronic device of claim 11, wherein the indication for delay measurement is obtained from differentiated service code point (DSCP) bits in a differentiated services (DS) field in headers of the first and second packets.

13. The electronic device of claim 11, wherein the indication for delay measurement is obtained from a context in header of the first and second packets when both the first and second network devices support network service header (NSH).

14. The electronic device of claim 11, wherein the measurement noise is obtained through calculating time stamp differences using time stamps of measurement packets exchanged between the electronic device and the first network device, and the electronic device and the second network device.

15. The electronic device of claim 11, wherein the electronic device is a SDN controller of the SDN system.

16. A non-transitory machine-readable storage medium having instructions stored therein, which when executed by a processor, cause the processor to perform operations in an electronic device coupled to a software-defined networking (SDN) system, wherein the SDN system includes a SDN controller managing a plurality of network devices, the operations comprising:
upon receiving a first packet of a first network device of the plurality of network devices, recording a first time stamp in a set of ingress time stamps if the first packet includes one indication for delay measurement and if the first network device is an ingress network device of a traffic flow, wherein the first time stamp is to be associated with a flow identifier included in the first packet;
upon receiving a second packet of a second network device of the plurality of network devices, recording a second time stamp in a set of egress time stamps if the second packet includes one indication for delay measurement and if the second network device is an egress network device of the traffic flow, wherein the set of egress time stamps is to be associated with the flow identifier, and the set of ingress time stamps; and
calculating a delay measure for the traffic flow based on at least the sets of the ingress time stamps and egress time stamps associated with the flow identifier, and a measurement noise the electronic device obtained from sending measurement packets to the first and second network devices.

17. The non-transitory machine-readable storage medium of claim 16, wherein the operations further comprise:
determining that the sets of the ingress and egress time stamps are sufficient to produce the delay measure with accuracy prior to calculating the delay measure.

18. The non-transitory machine-readable storage medium of claim 17, wherein the determining includes comparing a number of ingress and egress time stamps in the sets with a threshold number, and wherein the threshold number is determined using an error range, a confidence interval that an error of the delay measure outside of the error range is within a probability.

19. The non-transitory machine-readable storage medium of claim 16, wherein the first packet is duplicated from one packet forwarded by the first network device and destined to the second network device, and wherein the second packet is duplicated from the one packet received from the first network device.

20. The non-transitory machine-readable storage medium of claim 16, wherein the measurement noise is obtained through calculating time stamp differences using time stamps of measurement packets exchanged between the electronic device and the first network device, and the electronic device and the second network device.

* * * * *